Figure 1E:
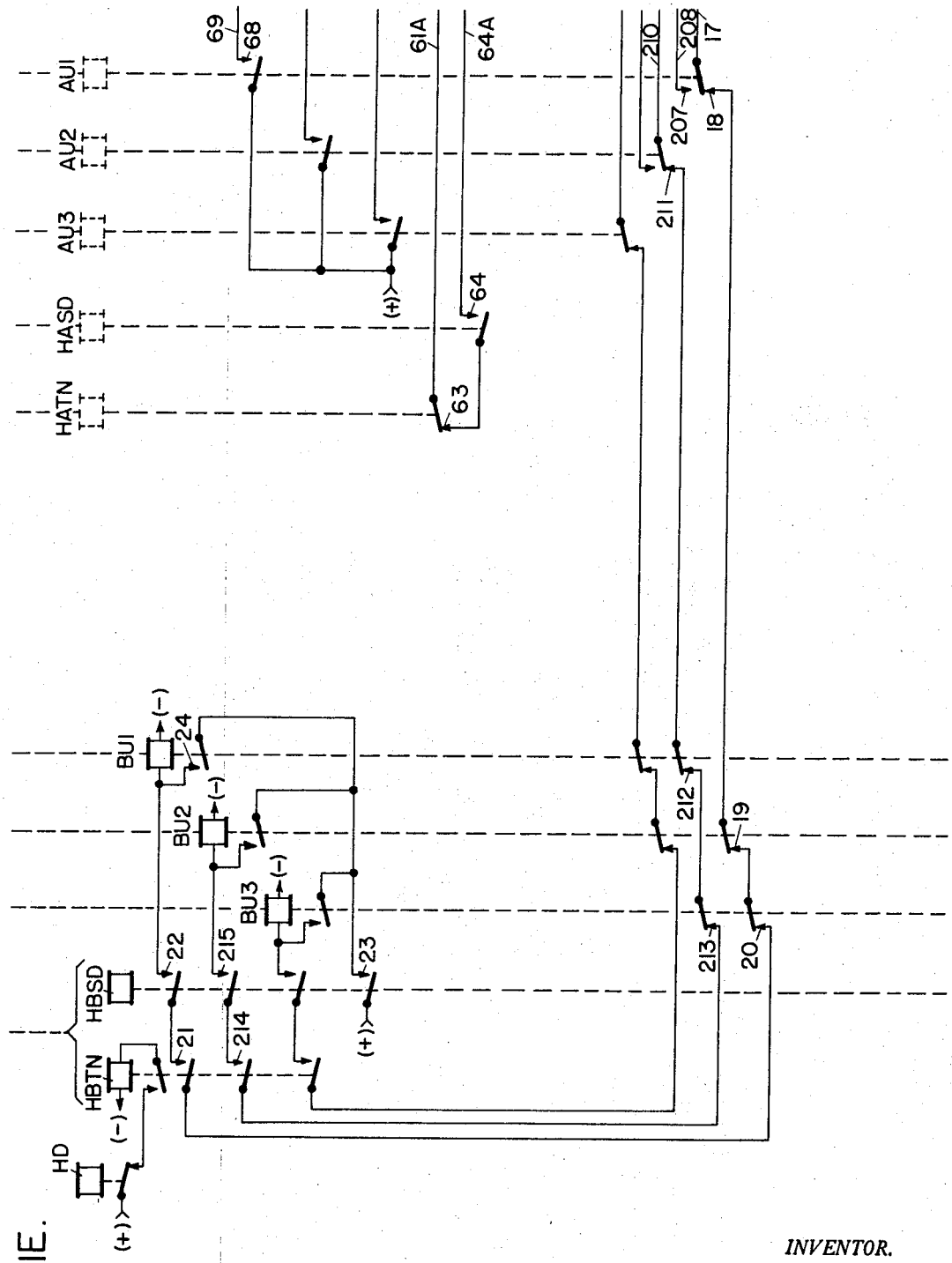

Dec. 12, 1967  W. R. SMITH  3,358,139
CAR RETARDER CONTROL SYSTEM
Filed Sept. 6, 1960  19 Sheets-Sheet 1
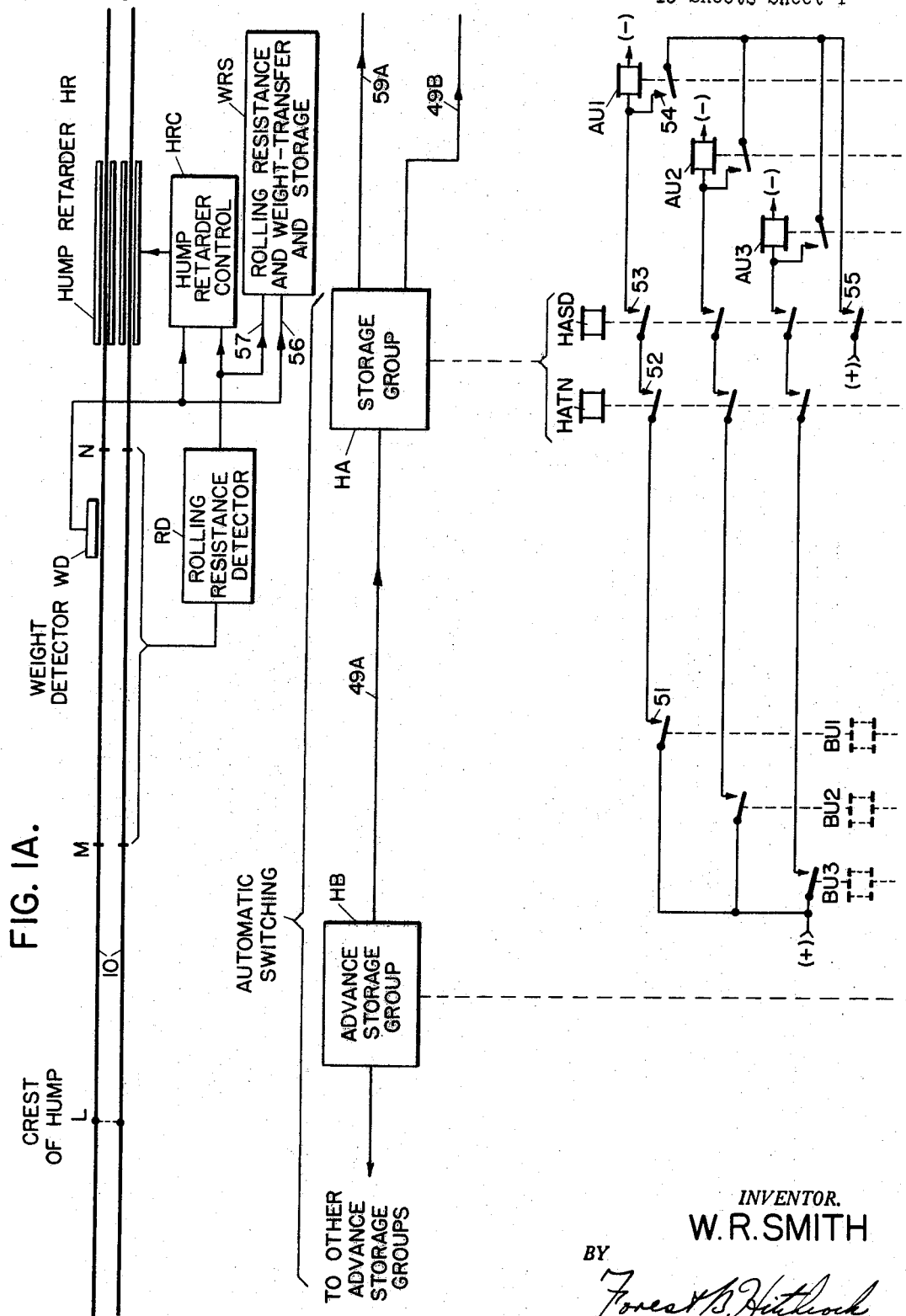
FIG. IA.
INVENTOR.
W. R. SMITH
BY
Forest B. Hitchcock
HIS ATTORNEY

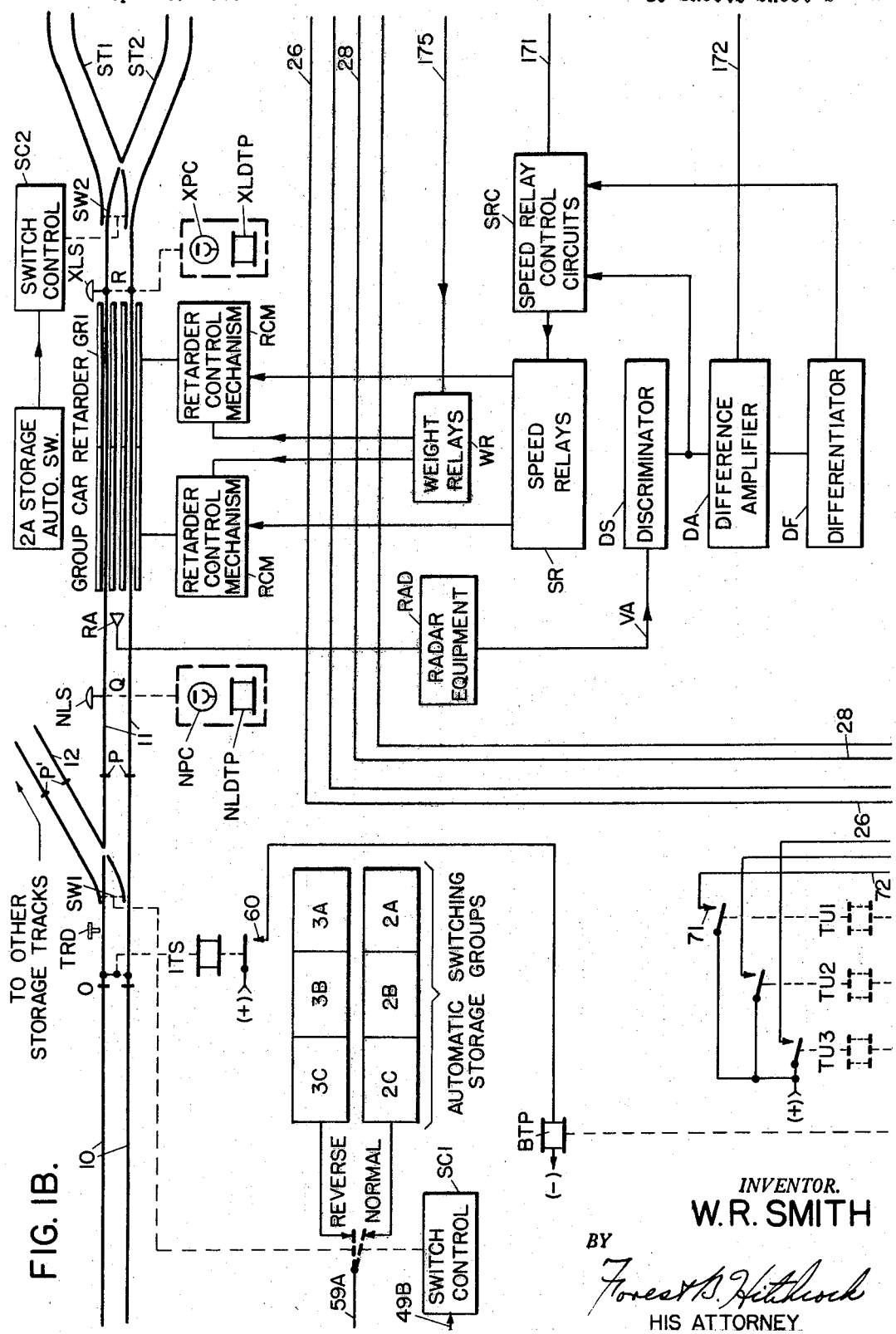
FIG. IB.
INVENTOR.
W. R. SMITH
BY
Forest B. Hitchcock
HIS ATTORNEY

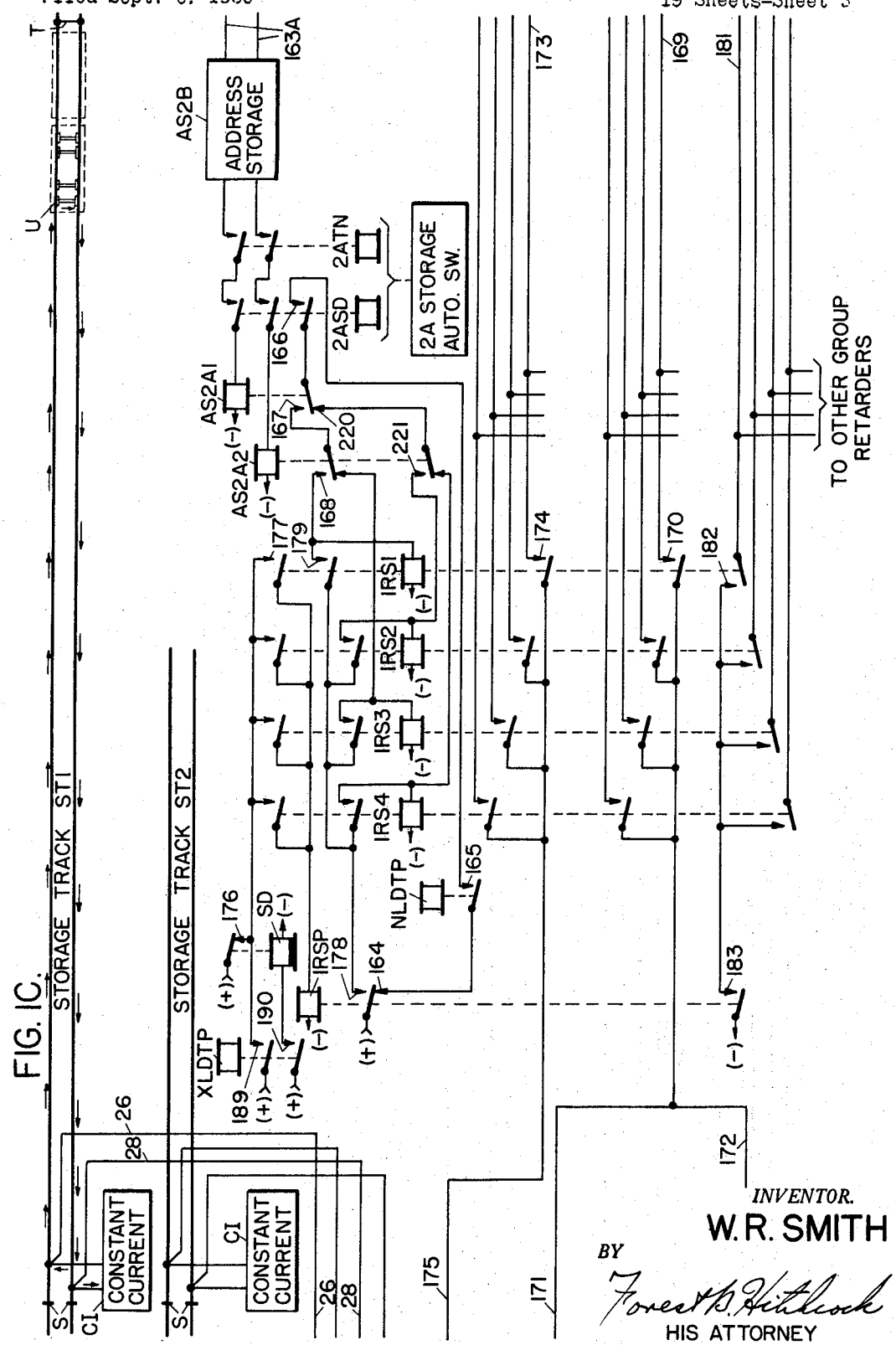

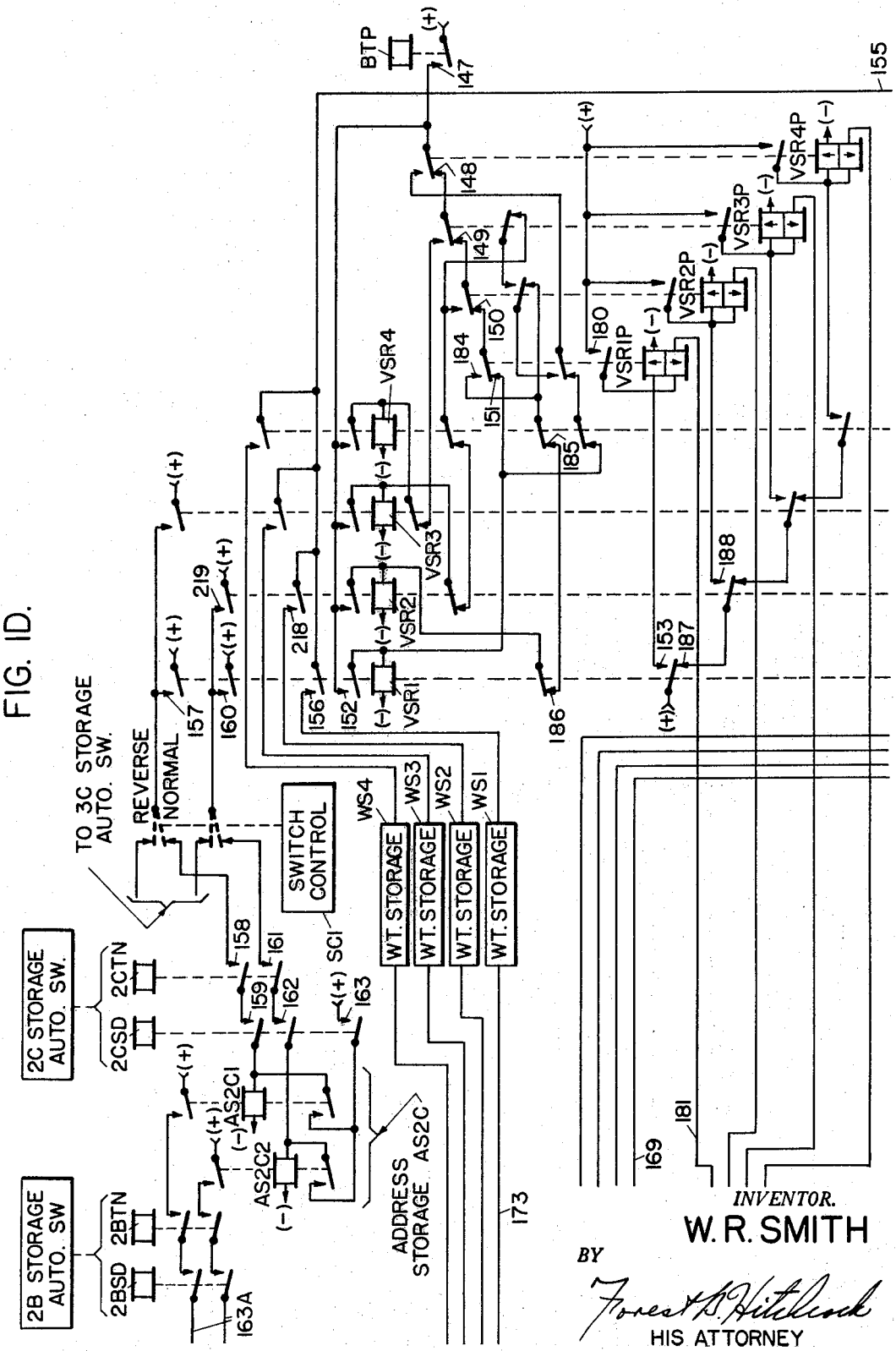

Dec. 12, 1967     W. R. SMITH     3,358,139
CAR RETARDER CONTROL SYSTEM
Filed Sept. 6, 1960     19 Sheets-Sheet 6
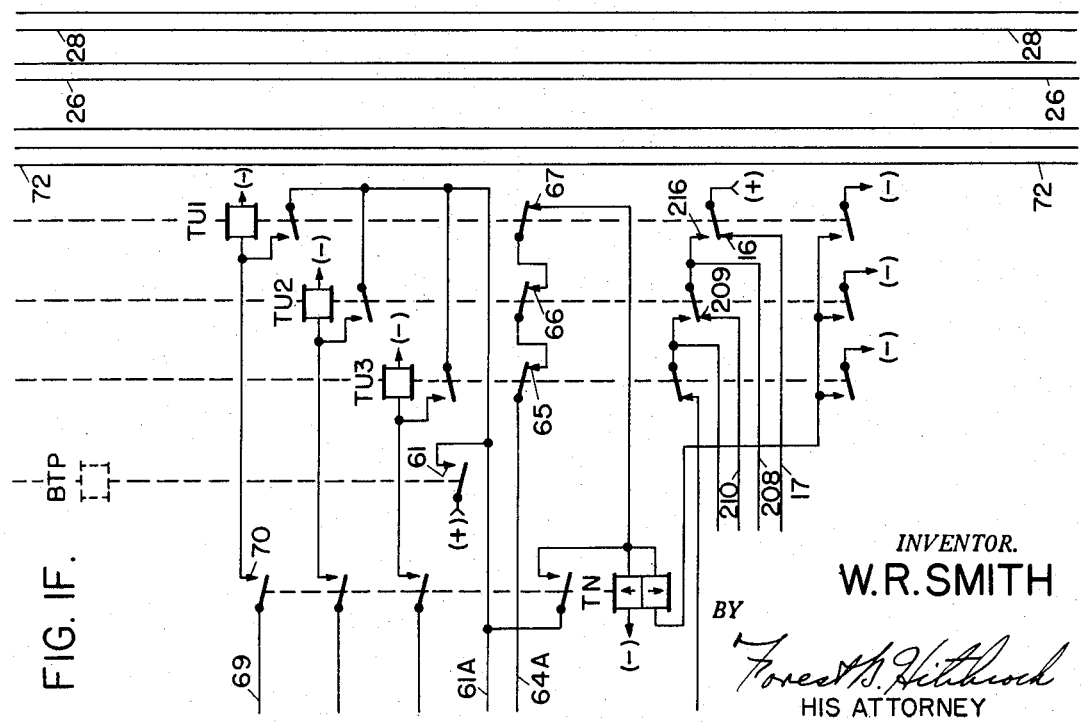
INVENTOR.
W. R. SMITH
BY
*Forest H. Hitchcock*
HIS ATTORNEY Dec. 12, 1967  W. R. SMITH  3,358,139
CAR RETARDER CONTROL SYSTEM
Filed Sept. 6, 1960  19 Sheets-Sheet 8

FIG. 1H.

INVENTOR.
W.R. SMITH
BY
Forest B. Hitchcock
HIS ATTORNEY

Dec. 12, 1967    W. R. SMITH    3,358,139
CAR RETARDER CONTROL SYSTEM
Filed Sept. 6, 1960    19 Sheets-Sheet 9

FIG. IJ.

*INVENTOR.*
W. R. SMITH
BY
*Forest B. Hitchcock*
HIS ATTORNEY

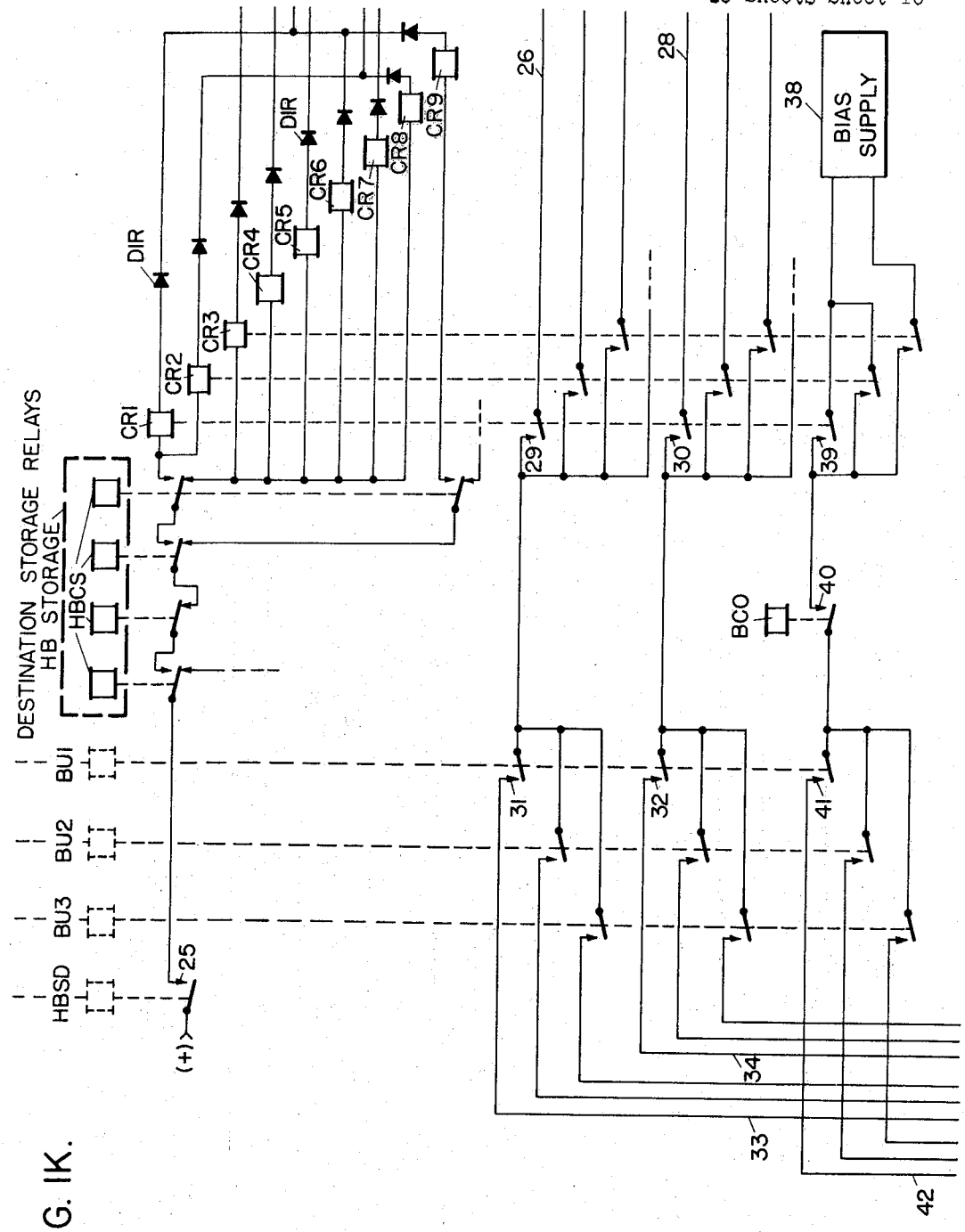

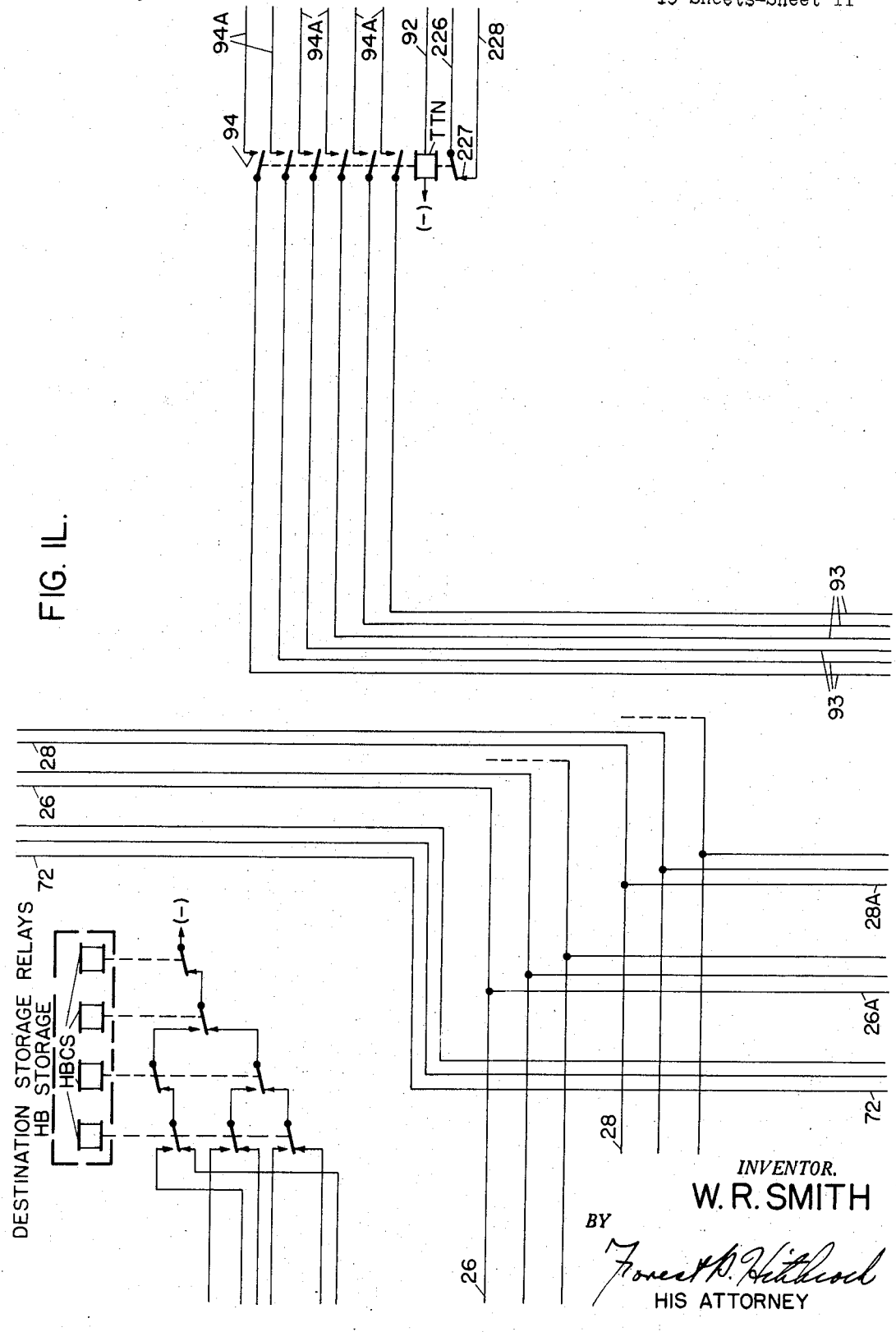

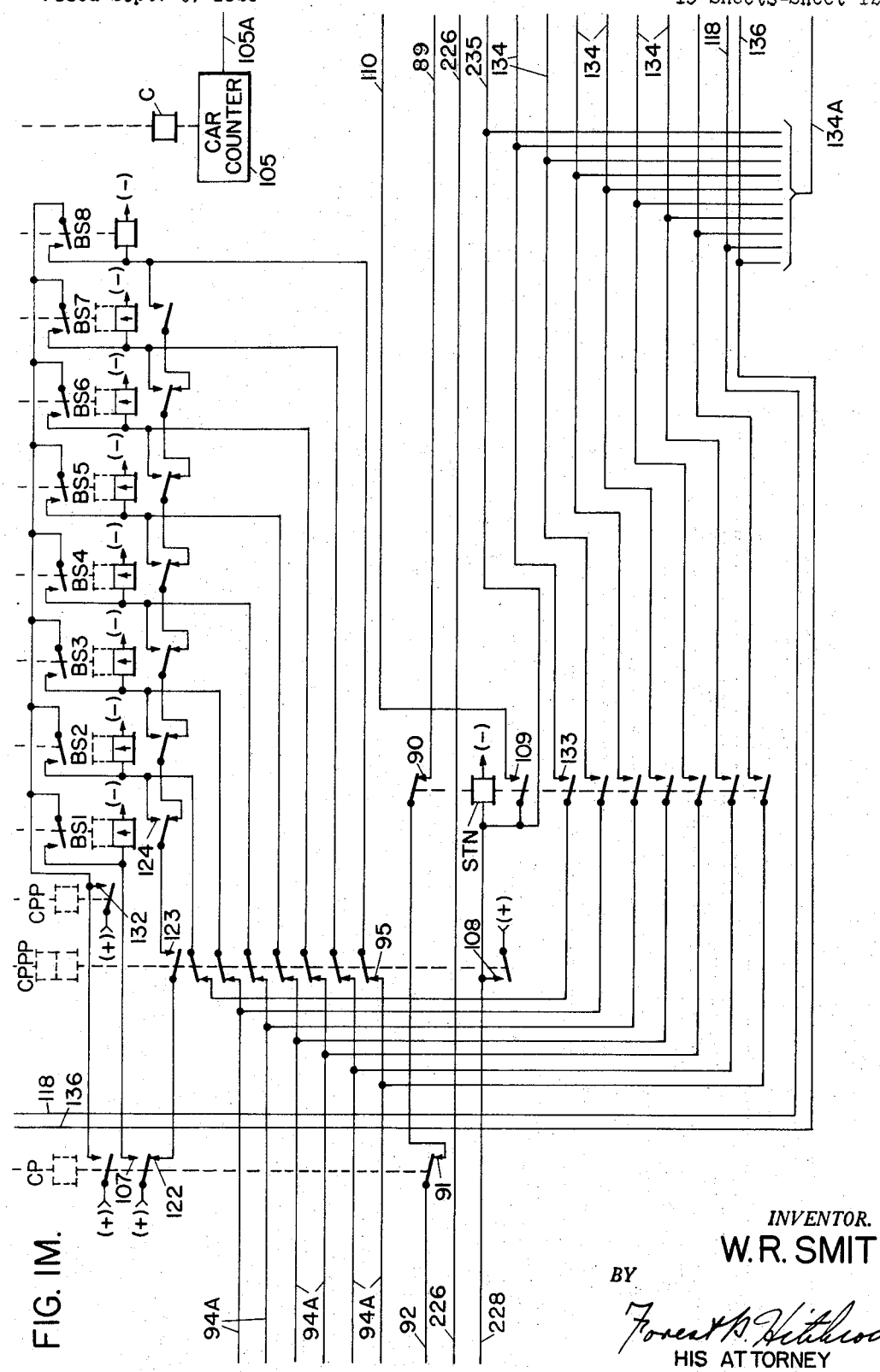

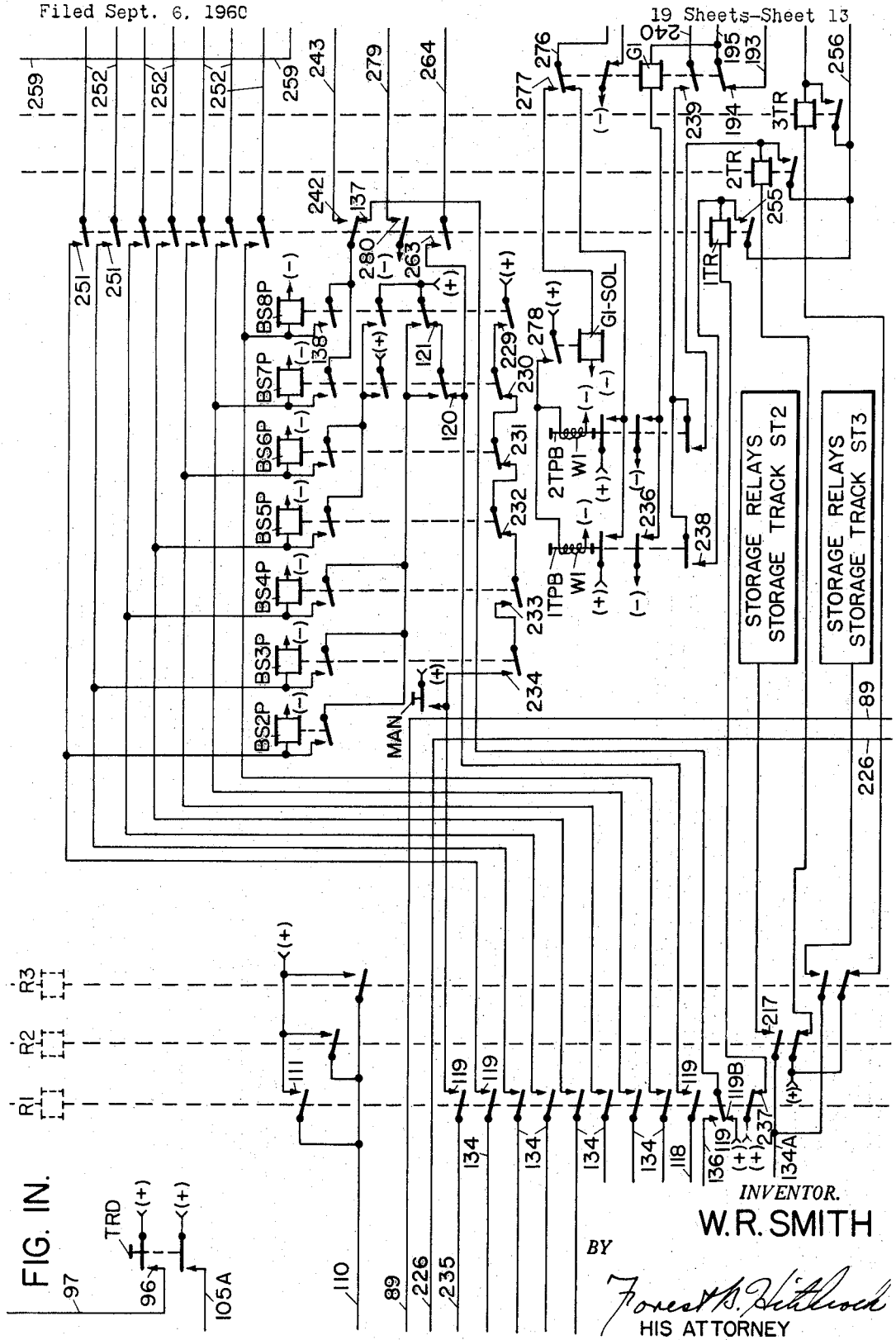

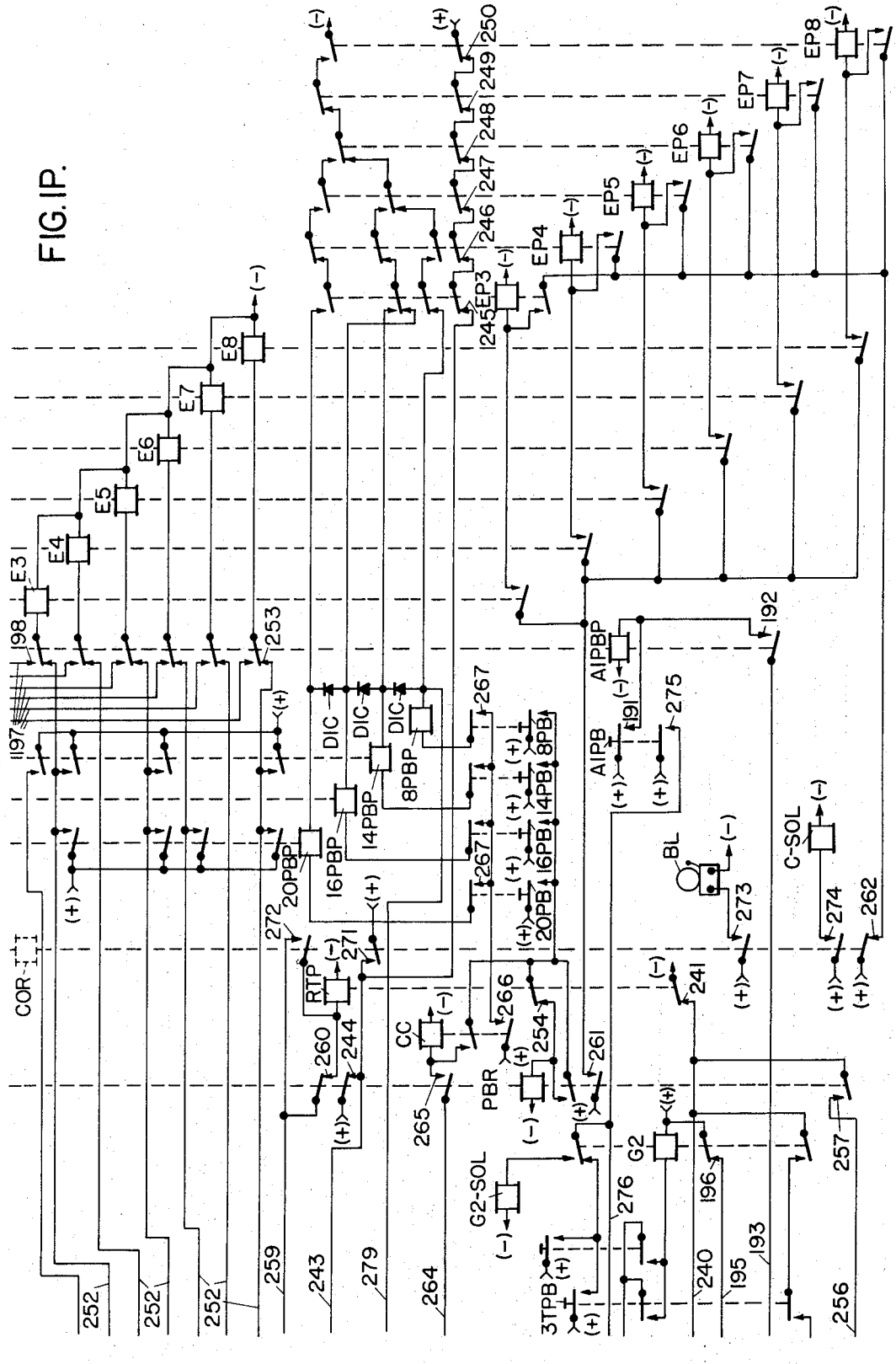

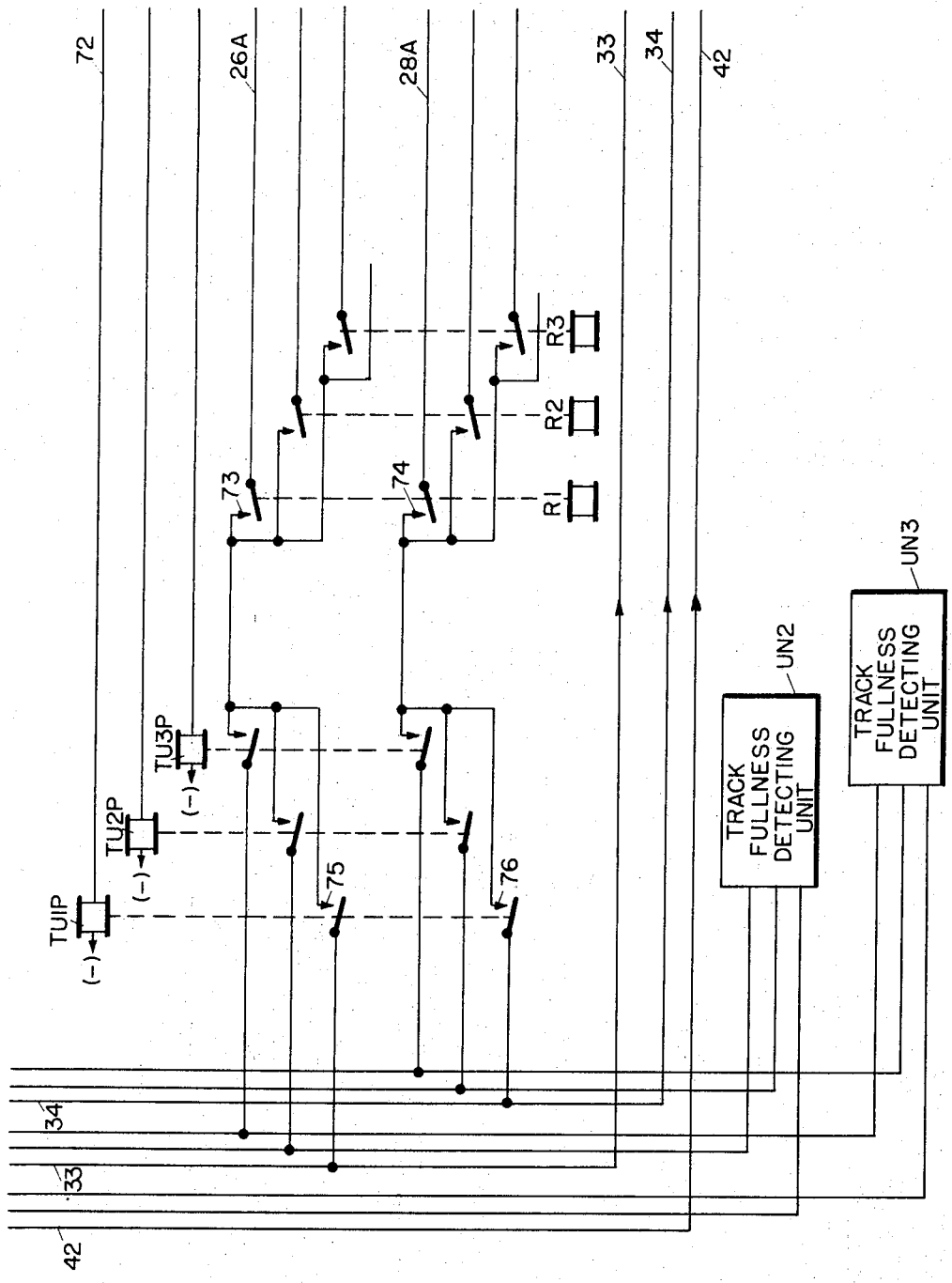
FIG. IQ.

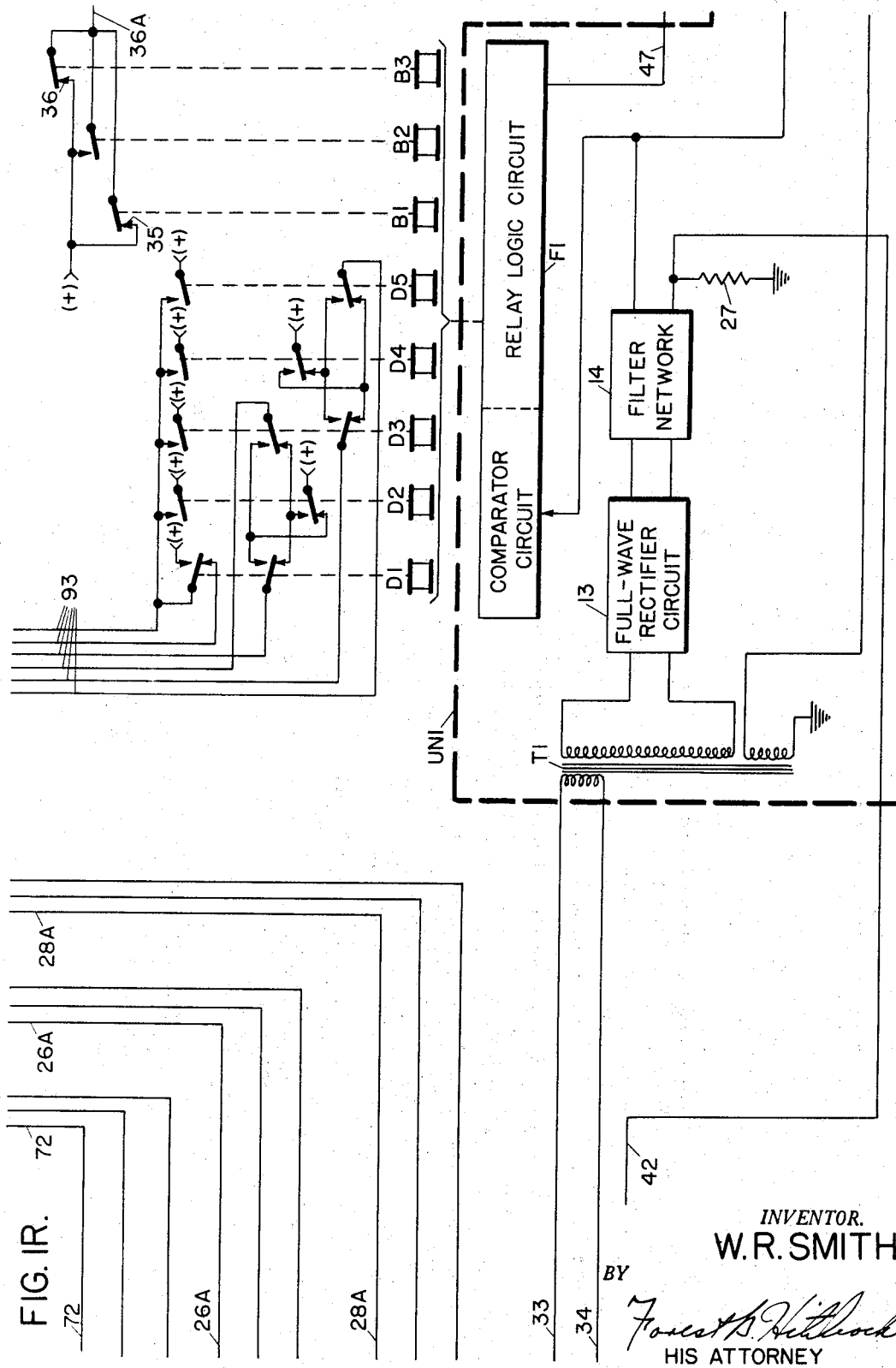
FIG. IR.

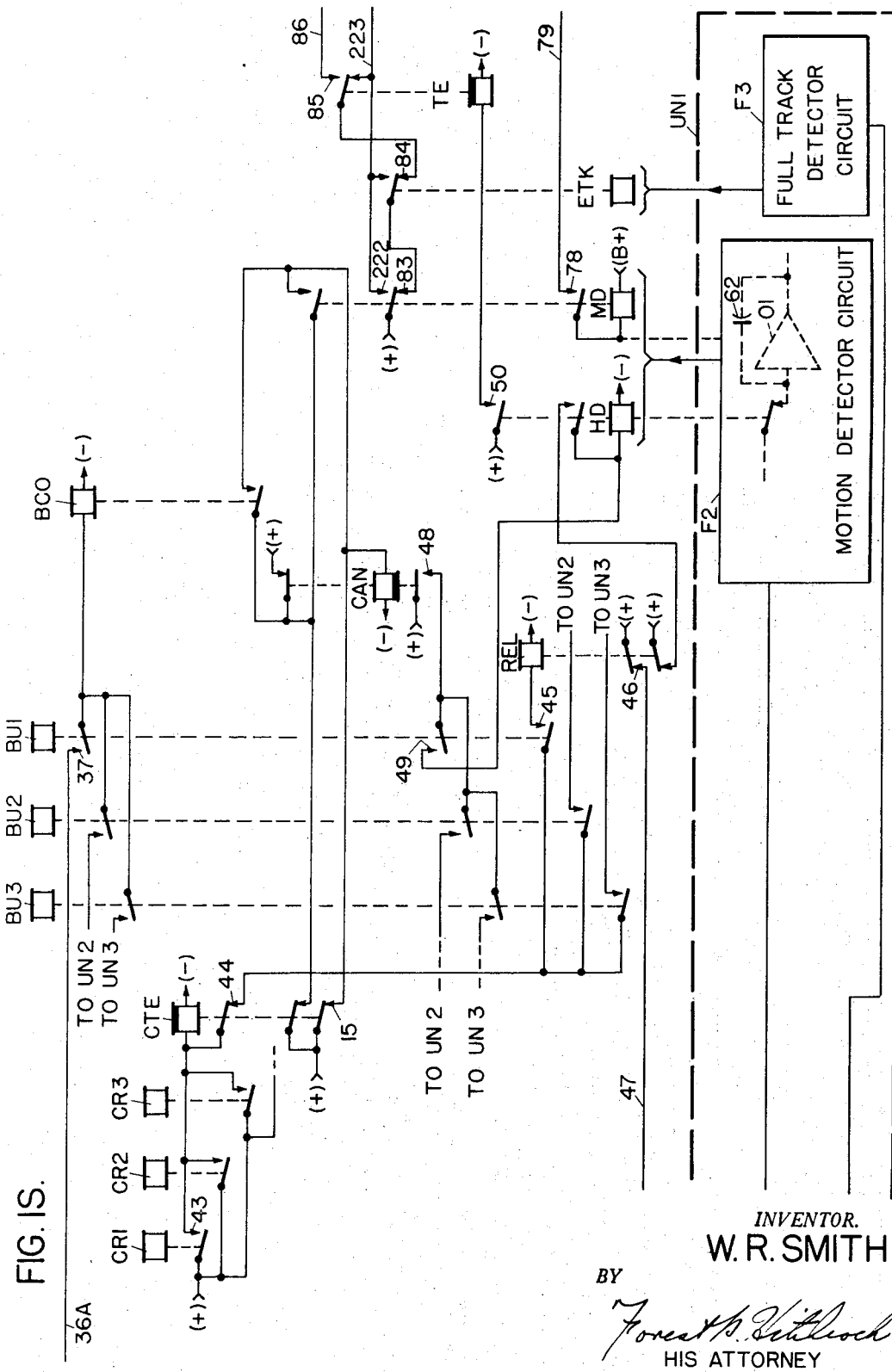

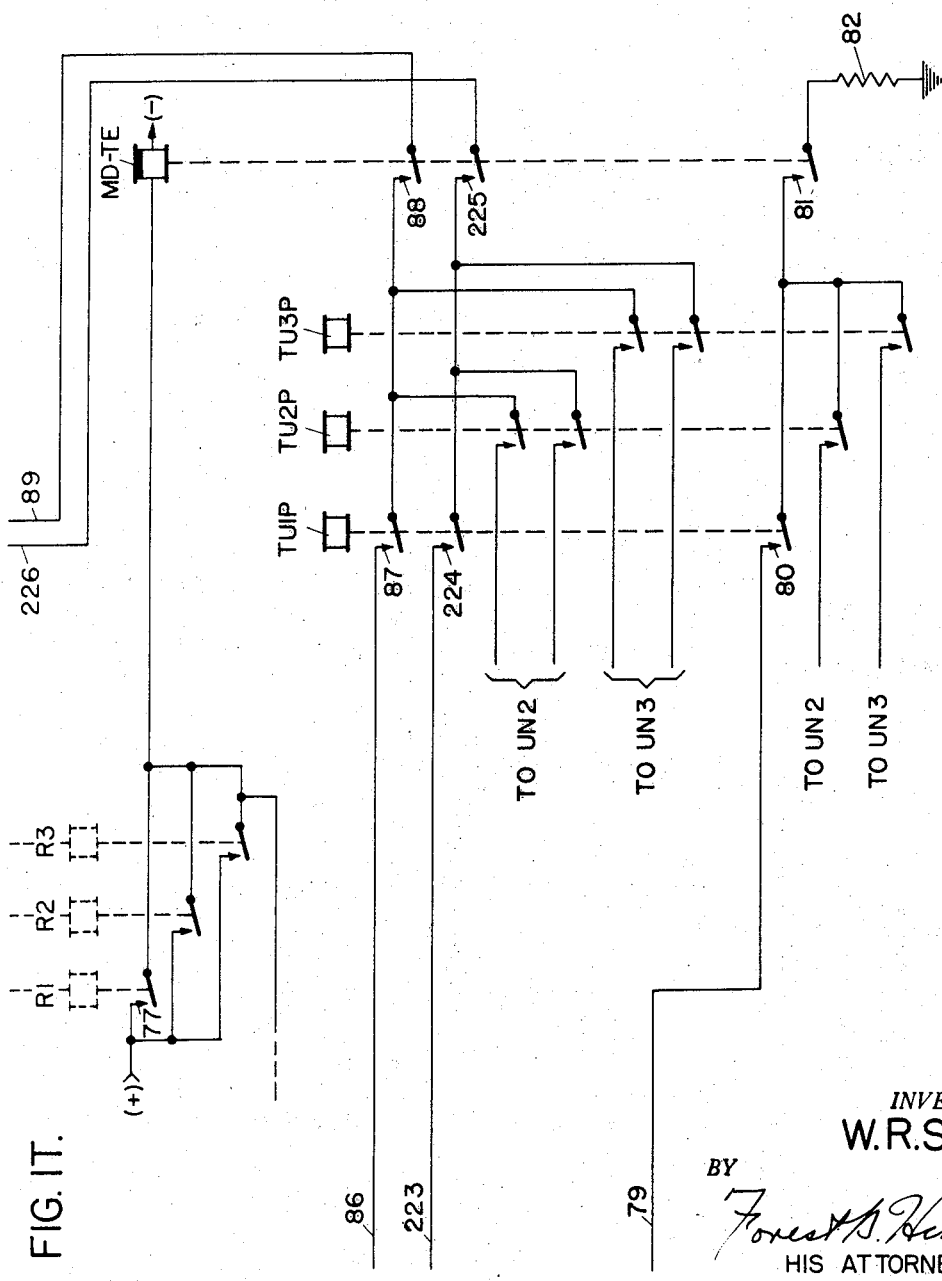

FIG. 2.

| DISTANCE TO GO IN VACANT CAR SPACES | DECODING RELAYS | | | | | COUNTING RELAYS | | | | | | |
|---|---|---|---|---|---|---|---|---|---|---|---|---|
| | D1 | D2 | D3 | D4 | D5 | BS2 | BS3 | BS4 | BS5 | BS6 | BS7 | BS8 |
| 32 | X | – | – | – | – | – | – | – | – | X | – | X |
| 31 |   |   |   |   |   | X | – | – | – | X | – | X |
| 30 | X | – | – | – | X | X | X | – | – | X | – | X |
| 29 |   |   |   |   |   | – | X | – | – | X | – | X |
| 28 | X | – | – | X | – | – | X | X | – | X | – | X |
| 27 |   |   |   |   |   | X | X | X | – | X | – | X |
| 26 | X | – | – | X | X | X | – | X | – | X | – | X |
| 25 |   |   |   |   |   | – | – | X | – | X | – | X |
| 24 | X | – | X | – | – | – | – | X | X | X | – | X |
| 23 |   |   |   |   |   | X | – | X | X | X | – | X |
| 22 | X | – | X | – | X | X | X | X | X | X | – | X |
| 21 |   |   |   |   |   | – | X | X | X | X | – | X |
| 20 | X | – | X | X | – | – | X | – | X | X | – | X |
| 19 |   |   |   |   |   | X | X | – | X | X | – | X |
| 18 | X | – | X | X | X | X | – | – | X | X | – | X |
| 17 |   |   |   |   |   | – | – | – | X | X | – | X |
| 16 | X | X | – | – | – | – | – | – | X | – | – | X |
| 15 |   |   |   |   |   | X | – | – | X | – | – | X |
| 14 | X | X | – | – | X | X | X | – | X | – | – | X |
| 13 |   |   |   |   |   | – | X | – | X | – | – | X |
| 12 | X | X | – | X | – | – | X | X | X | – | – | X |
| 11 |   |   |   |   |   | X | X | X | X | – | – | X |
| 10 | X | X | – | X | X | X | – | X | X | – | – | X |
| 9 |   |   |   |   |   | – | – | X | X | – | – | X |
| 8 | X | X | X | – | – | – | – | X | – | – | – | X |
| 7 |   |   |   |   |   | X | – | X | – | – | – | X |
| 6 | X | X | X | – | X | X | X | X | – | – | – | X |
| 5 |   |   |   |   |   | – | X | X | – | – | – | X |
| 4 | X | X | X | X | – | – | X | – | – | – | – | X |
| 3 |   |   |   |   |   | X | X | – | – | – | – | X |
| 2 | X | X | X | X | X | X | – | – | – | – | – | X |
| 1 |   |   |   |   |   | – | – | – | – | – | – | X |

X = RELAY PICKED UP
– = RELAY DROPPED AWAY

United States Patent Office 3,358,139
Patented Dec. 12, 1967

3,358,139
CAR RETARDER CONTROL SYSTEM
Willis R. Smith, Rochester, N.Y., assignor to
General Signal Corporation
Filed Sept. 6, 1960, Ser. No. 54,075
4 Claims. (Cl. 246—182)

This invention generally relates to car retarder control systems for use in railway classification yards, and more particularly pertains to a car retarder control system whereby control is applied in accordance with the distance a railway car cut must travel to its coupling point.

In the usual classification yard layout, a single hump track, having an elevated portion known as the "crest," branches out through track switches into a plurality of group tracks and each of these group tracks further branches out through still more track switches into a plurality of storage tracks. Normally then, the cuts of railway cars being classified are allowed to roll, under influence of gravity, from the crest of the yard hump track onto predesignated storage tracks in accordance with the manner in which these cuts of railway cars are to be made up into various outgoing trains, the actuation of the various track switches encountered being controlled by automatic switching means.

To prevent large impacts from occurring when one railway car cut couples with the cars already standing on the designated storage track and therefore also to prevent damage to both cars and contents, various car retarders are strategically positioned at certain locations in the yard track layout to apply enough retardation to each cut of railway cars being classified to cause smooth coupling. In the usual classification yard a single car retarder, known as the "hump retarder," is positioned on the hump track so as to be effective on every cut of railway cars, while each group track is equipped with its own car retarder, known as the "group retarder" which is effective only on car cuts routed to the associated group track.

Obviously, each railway car cut is individual in nature with respect to its performance during free rolling movement and therefore these car retarders, both "hump" and "group," are normally conditioned to apply braking action in accordance with the various factors affecting the free rolling movement of the railway car cuts which include, among other things, rolling resistance and weight of cut. In addition, it seems apparent that one of the more important factors whereby the car retarders should be controlled, and each cut retarded to prevent excessive coupling impacts, is the distance a cut must travel to the coupling point on its designated storage track. Therefore, it is proposed in accordance with the present invention to provide control of the car retarders dependent upon the distance a cut must travel to its coupling point.

However, it should be pointed out at this time that in the normal classification yard, the hump retarder; i.e. the retarder situated on the hump track is employed mainly to apply initial retardation to each cut being classified so as to maintain the desired separation between distinct cuts for proper operation of the various track switches, and therefore it seems more advisable to apply control, in accordance with the distance a car must travel to its coupling point, to the group car retarders. Therefore, the control system of the present invention is more particularly associated with the group retarders than with the hump retarders. However, it should be understood that such retarder control as provided by the control system of the present invention may be used to control the hump car retarder as well as, or in preference to, the group car retarder where such control is deemed advisable.

Without attempting to define the scope of the present invention, it is proposed in accordance herewith to utilize a track fullness detection system similar to that disclosed in the U.S. application of K. H. Frielinghaus, Ser. No. 22,191, filed Apr. 14, 1960, now abandoned, for obtaining a digital registration representative of the measured or actual distance that the various car cuts must travel to the coupling points on their designated storage tracks. However, whereas, in the system as disclosed in the aforementioned Frielinghaus application, it was intended that the detection of the motional status on a particular storage track be performed before the digital registration of the so called "distance-to-go" is established for that storage track, it is more specifically proposed, in accordance with the present invention, to first establish the digital registration of the actual distance to coupling point for a particular cut and at some later time investigate the motional status on the designated storage track for that cut. Furthermore, it is intended, in the embodiment of the present invention shown herein, that the digital registration of the actual distance to coupling for a particular car be indicative of the total track distance extending between the exit end of the "group" retarder, associated with this particular car cut, and the rear axle of the last car having entered a storage track for which this car is bound, irrespective of whether or not this last car is in motion.

It is further proposed to provide a stored registration, representative of the distance to coupling for a railway car cut, and usable, for example, in the event that motion is occurring on the particular storage track thereby setting up one condition wherein the actual distance to coupling registration, as provided by the above mentioned track fullness detection system, is unusable.

It is further proposed to cause selection between the actual and stored distance to coupling registrations in accordance with the various conditions wherein the actual distance to coupling registration is unusable. Among these various conditions are; an indication of motion occurring on the storage track, insufficient time lapse to detect motion on the storage track, and the fact that the storage track may be filled to capacity.

It is further proposed that this stored registration of the distance to coupling be produced by employing a car counting system which subtracts the number of cars in each distinct cut from the distance to coupling registration selected for that cut, thus keeping a continual check on the vacancy of the storage tracks. In other words, the stored distance to coupling registration associated with each cut of railway cars is the selected registration for the preceding cut, destined for the same storage track, less the number of cars counted in that preceding cut.

It is then proposed to feed the selected distance to coupling registration, either actual or stored, to an analog computer along with the various other factors affecting the free rolling movement of the railway car cuts; such as, the rolling resistance and weight of the cut, and it is intended in accordance with the present invention that the above mentioned analog computer be of the type which solves the equation(s) preset in it and which provides as an output a voltage analog of the correct speed which each cut should exit from its associated group retarder so as to cause smooth coupling between the railway car cuts.

In order that a single computer may be employed to handle every cut of railway cars being routed, thus eliminating the need for a separate computer at each group retarder, it is further proposed to employ certain voltage storages capable of successively storing a plurality of these computed outputs, as associated with successive railway car cuts, until the successive cuts are about to enter their designated group retarders; i.e. each successive output from the analog computer advances, in turn, through the storages until called for by the detection of the car cuts at the entrance of the group retarders for which they are destined. It is then proposed to utilize the stored computer outputs in a manner similar to that disclosed in the U.S. application of Auer et al., Ser. No. 782,153, filed Dec. 22, 1958, now Patent No. 3,268,725 for positioning the group retarders to various degrees of braking in accordance with these computer release speeds.

In an automatic car retarder control system such as is proposed in accordance with the present invention, it is sometimes necessary for the hump operator to make corrections to the stored registration of the distance to coupling. One example of when such a correction is necessary is illustrated by the stopping of a cut, on its designated storage track, short of its desired coupling point. However, it has been observed that some operators will deliberately extend the stored distance to coupling registration for the next similarly destined car cut so as to drive down this "stopped short" cut. Obviously, this has two major disadvantages; (1) very large impact occurs when the "stopped short" cut is driven down and (2) the cut which does the driving usually stops at the point of impact thus presenting a similar problem to the hump operator.

It is therefore further proposed in accordance with the present invention to provide preventive means operable in such a manner that the operator cannot extend the stored distance to coupling registration for the purpose of driving down a "stopped short" car.

With the above considerations in mind, one object of the present invention is to provide car retards control in accordance with the distance the railway car cuts being classified must travel to the coupling points on their designated storage tracks.

Another object of this invention is the provision of both actual or stored registrations of the distance to coupling for each distinct cut of railway cars and to provide for selecting between these two registrations in accordance with the various conditions wherein the actual distance to coupling registration is unusable.

Another object of the present invention is to provide a car counting system common to every cut of railway cars being classified for producing a stored distance to coupling registration for each cut.

A still further object of this invention is to provide means for computing the release speeds at which the associated car retarders should be operated to an "open" or non-braking position so as to release the braking action of the retarders on railway car cuts passing through them, and means for storing these computed release speeds for every cut of railway cars being classified until this speed information is required for car retarder control purposes.

Another object of this invention is the provision of means for preventing the hump operator from extending the distance to coupling information for the purpose of driving down a "stopped short" car.

In certain of the circuit organizations used in the embodiment of the present invention shown herein it is desirable to convert a scalar or conventional code into a reflected binary code for the purpose of eliminating excessive relay operation of certain associated relay circuits. Therefore a still further object of the present invention is the provision of simple relay means for converting a scalar binary code into a reflected binary code without the use of complex electronic circuits.

Other objects, purposes and characteristic features of the present invention will be in part obvious from the accompanying drawings, and in part pointed out as the description of the invention progresses.

In describing the invention in detail, reference will be made to the acompanying drawings, in which like reference characters designate corresponding parts and in which:

FIGS. 1A through 1T (except that there are no FIGS. 1I and 1O), illustrate schematically, and partially by block diagram, the general circuit organization of one embodiment of the present invention;

FIG. 2 illustrates a code chart by which certain of the relay groups of the present embodiment are assumed to be energized; and FIG. 3 is an arrangement plan illustrating how FIGS. 1A through 1T must be arranged in relation to each other to present a complete circuit diagram.

In order to simplify the illustrations of the drawings and facilitate in the explanation of the fundamental characteristics of the invention, various parts and circuits have been shown diagrammatically in accordance with conventional symbols. Arrows with associated (+) and (−) are employed to indicate connections of the circuits of various relays to the opposite terminals of a suitable source of current for energization of such relays; and the source of current may be of any suitable characteristic for the purpose intended. The various contacts of the relays involved in the illustrations are shown conventionally as being in a lower or inclined position when the coil or winding of the associated relay is deenergized, and in a raised or horizontal position when the relay is energized; the contacts belonging to any given relay are shown connected to its coil or winding by dotted lines, and these contacts may be either below or above the illustration of the relay winding. The front and back contacts between which the movable contacts are operated by the different relays are shown conventionally as arrow heads, and the movable contacts are ordinarily of the type which have their contacts pulled downwardly by gravity or by spring action.

With reference to FIGS. 1A through 1C of the accompanying drawings, a partial track layout is shown with which the embodiment of the present invention shown herein may be associated during application of the present invention.

A hump track 10 is illustrated as branching out through a track switch SW1 to group tracks 11 and 12, and group track 11 is illustrated as branching out, through track switch SW2 to storage tracks ST1 and ST2. To further simplify the disclosure of the present invention, group track 11 and storage track ST1 have been shown in detail while group track 12 and storage track ST2 have only been partially illustrated.

According to actual practice, the track layout of a classification yard generally includes a much greater number of tracks than that shown in the accompanying drawings. However, it is to be understood that the simplified yard layout of the present embodiment as shown in FIGS. 1A to 1C is selected to facilitate the disclosure of the invention, and that the system herein disclosed is readily adaptable for use in such larger track layouts.

Referring more specifically now to FIG. 1A, hump track 10 is provided with the usual elevated crest which can be considered located at point L. Furthermore, hump track 10 is equipped with a hump-retarder HR for the purpose of initially retarding each railway car cut being classified so as to maintain the desired separation between these cuts as they are being classified. In addition, hump track 10 is provided with a track section extending between points M and N wherein the rolling resistance for each cut being classified is detected by rolling resistance detector RD. It is intended in accordance with the present invention that the means for detecting the car rolling resistance be of any suitable type for determining the tangent track rolling resistance of each cut or else of the type such as that described in the U.S. application of A. V. Dasburg, Ser. No. 804,294, filed Apr. 6, 1959, now abandoned, wherein both tangent and curved track rolling resistances of a railway car cut are determined.

A weight detector WD is also provided in advance of the hump retarder HR so as to detect the weight classification for each cut being classified prior to the entrance of that cut into the hump retarder HR and it is intended that any suitable weight detecting system may be utilized such as is described, for example, in the U.S. patent to S. M. Phelps, Patent No. 2,868,534, granted Jan. 13, 1959.

After the weight and rolling resistance classification, for a particular car cut, has been performed by weight detector WD and rolling resistance detector RD, this information is fed to weight and rolling resistance transfer and storage apparatus WRS, shown in FIGS. 1A and 1H, wherein it remains until such time as it is needed to provide control of the group retarder for which the associated car cut is bound.

A detector track circuit, shown diagrammatically in FIG. 1B as extending between points O and P, and between points O and P', is provided with the usual shunt track relay ITS so as to detect the presence of a car cut approaching track switch SW1. One purpose of such detection is that of controlling the automatic switching apparatus associated with the classification yard to position track switch SW1 to the required position (either "normal" or "reverse") in accordance with the designated storage track for each car cut being classified. Furthermore, this detector track circuit has mounted on it, a treadle TRD which is actuated by railway car wheels and which coacts with certain car counting equipment, shown in FIG. 1M, so as to provide a car count for each car cut being classified.

A group retarder GR1 is strategically located on group track 11 to provide final retardation to each railway car cut being routed to either storage track ST1 or storage track ST2 so as to cause smooth coupling between railway car cuts. For simplicity it will be assumed that storage tracks ST1 and ST2 are the only storage tracks associated with group track 11 and that any additional storage tracks are associated with the remaining group tracks of the classification yard.

For reasons which will be discussed later, it is provided to detect the presence of the car about to enter group retarder GR1. Therefore, an entrance light detection system, including light source NLS, entrance photocell NPC, and relay NLDTP, is situated slightly in advance of group retarder GR1 at point Q. Although no energizing circuits for relay NLDTP are shown, it is intended that this relay NLDTP be energized only while a railway car cut interrupts the light beam at point Q.

A radar antenna RA is positioned adjacent the entrance end of retarder GR1 and is associated with certain radar equipment RAD, to be described at a later time, for the purpose of measuring the actual speed at which a railway car cut passes through group retarder GR1. The principle of operation of the above mentioned radar apparatus is fully described in the U.S. application of Kendall et al., Ser. No. 359,162 filed June 2, 1953, now Patent No. 3,125,315 and can be summarized as follows: ultrasonic energy is transmitted from radar antenna RA into the group car retarder GR1 and is reflected from any car therein back to antenna RA with an apparent change in frequency of the energy in accordance with the well known Doppler effect. Both the transmitted and received ultrasonic energy is then utilized by the above mentioned radar equipment RAD so as to provide an output from this radar equipment RAD which is an analog quantity proportional to the actual speed of a car cut passing through the group car retarder GR1.

It is then intended that this analog quantity VA be utilized as described in the U.S. application of Auer et al., Ser. No. 782,153, for controlling the various degrees of braking action of retarder GR1 in accordance with the speed at which a railway car cut is passing through it. Thus, certain group retarder control apparatus, as disclosed by the system of the above mentioned Auer et al. application Ser. No. 782,153, is illustrated in FIG. 1B and includes; discriminator DS, difference amplifier DA, differentiator DF, speed delays SR, speed relay control circuits SRC, weight relays WR, and retarder control mechanisms RCM.

At the exit end of group car retarder GR1, point R, is situated a second light detection system, including light source XLS, photocell XPC, and relay XLDTP, for detecting the presence of a railway car cut at the exit end of group retarder GR1; that is, relay XLDTP is energized as long as a car cut interrupts the light beam at point R.

Although the above discussion particularly relates to apparatus associated with group retarder GR1, it should be understood that other group retarders (not shown) would be similarly equipped; that is, each group retarder would have its own entrance and exit light detection systems, and group retarder control apparatus.

After leaving the exit end of group retarder GR1, group track 11 branches out through track switch SW1 onto storage tracks ST1 and ST2, of which storage track ST1 is shown in detail as being electrically continuous from the entrance end S, in FIG. 1C, to the point of cross bonding at point T.

Referring now to FIG. 1C of the accompanying drawings, each storage track is provided with a constant current source CI connected at the normal entering end S for the purpose of supplying to the track rails, of that storage track, a constant magnitude current irrespective of any railway cars which may be shunting the track rails of this storage track. For example, referring to the illustration of storage track ST1, constant current source CI causes a constant magnitude current to flow in a current path defined by the short arrows in FIG. 1C.

With reference to the U.S. application of K. H. Frielinghaus, Ser. No. 22,191, filed Apr. 14, 1960, now abandoned, a voltage is thereby produced at the entering end S, which is the analog of, or in other words is directly proportional to, the length of track that then exists between point S and the position of the rear axle of the last car having entered the storage rack ST1. Referring again to FIG. 1C, the position of the rear axle of the last car having entered this storage track is designated as point U.

The analog voltage signal, produced at the entrance end of storage track ST1, for example, is applied, as will be discussed later, as input to track fullness detecting apparatus operated, for the most part, as disclosed in the aforementioned U.S. application of K. H. Frielinghaus, Ser. No. 22,191, filed Apr. 14, 1960. In addition, certain biasing voltage is also applied as input, to the track fullness detecting apparatus, and is an equivalent analog of the known track length existing between the exit end of group retarder GR1 and the entrance end S. Thus, it is now apparent that the total input voltage to the track fullness detecting unit is an analog of the distance between the exit end of group retarder GR1 and the rear axle of the last car having entered storage track ST1.

Referring now to FIGS. 1R and 1S of the accompanying drawings, a typical track fullness detecting unit UN1 (shown enclosed in a heavy dashed line block) consists, for the main part, of an input step up transformer T1, a full wave rectifier circuit 13, a filtering network 14, an analog voltage to digital code converter F1, a motion detector circuit F2, and a full track detector circuit F3. These constituents of the typical track fullness detecting unit are illustrated in block diagram form mainly for simplicity of disclosure and the details of their respective operation are available by reference to the above mentioned U.S. application of K. H. Frielinghaus, Ser. No. 22,191. In addition, unit UN1 includes a resistor 27, across which the above mentioned biasing voltage is developed so as to set the operating level for full wave rectifier 13 and filter network 14.

More specifically, the analog voltage to digital code converter F1 consists of a comparator circuit and a relay logic circuit for converting the total input voltage signal; i.e. with bias, into digital data representative of the actual distance a car cut must travel from the exit end of its associated group retarder to the last car having entered the designated storage track.

The motion detector circuit F2 includes an operational amplifier O1, shunted by a storage capacitor 62, whereon a certain value of the analog input voltage signal is stored for comparison with a later accepted value of this same analog voltage signal so as to determine the motional status on the storage tracks.

Furthermore, the full track detector circuit F3 is provided with a relay ETK which is energized when the analog input voltage signal reaches a predetermined desirable minimum value so as to indicate that the storage tracks are filled to capacity or that no more railway cars can be safely routed to these storage tracks.

To insure that more than one railway car cut can be handled while such cuts are simultaneously in progress in the classification yard layout, a plurality of track fullness detecting units, similar to that just described, are employed. It is provided, in accordance with the present invention, to select a particular track fullness detecting unit to be associated with a particular cut of railway cars until both an actual distance to coupling registration and a motional investigation have been performed for that cut of cars.

Referring to FIGS. 1A, 1E and 1F, a plurality of unit selector relays BU, AU and TU are provided for accomplishing the above mentioned selection; i.e. selecting a track fullness detecting unit, not already in use, to be associated with each particular car cut and storing the address of this selected unit while such unit is being utilized during the classification of the particular railway car cut.

An automatic switching system is utilized in the present invention and for convenience it may be considered of the type disclosed, for example, in the U.S. patent to Brixner et al., Patent No. 2,700,728 granted Jan. 25, 1955.

In an automatic switching system of this type the various track switches encountered by a particular railway car cut progressing to its designated storage track are positioned in accordance with a destination code established at the hump tower by the hump operator or some other person having supervision over the classification of railway cars. It has been usual practice to provide a bank of push buttons, each push button associated with one of the storage tracks of the classification yard, and to provide for establishing the destination code to be associated with each particular railway car cut in accordance with the particular push button depressed by the hump operator. However, it should be understood that various other means may be used to establish such a destination code such as programming by punch tape or card, etc. In addition, an automatic switching system of this type is made up of a plurality of storage groups, dependent upon the requirement of the classification yard layout, wherein each storage group includes a transfer relay TN, a slow drop-away storage detector relay SD, and code storage relays CS. Of these, the code storage relays CS are energized in various combinations in accordance with the destination code established at the hump tower.

Referring to FIGS. 1A and 1B, each track switch in the classification yard layout has associated with it an A storage group of the automatic switching system which properly positions the associated track switch when a destination code is received by this storage group. Furthermore, certain additional advanced storage groups, designated in FIGS. 1A and 1B of the accompanying drawings as the B, C, etc. storage groups are provided in accordance with the spacing between the respective track switches so as to store and transfer the destination codes for additional railway car cuts located between track switch locations. For example, track switch SW1 is positioned in accordance with the destination code received by the storage group HA while an advance storage, storage group HB, is provided to store the destination code for a following railway car cut. Also, track switch SW2 is positioned in accordance with the destination code received at storage group 2A while advance storage groups 2B and 2C are provided to account for any additional railway car cuts which may be located between track switch SW1 and track switch SW2.

It should be pointed out at this time that the illustration of a single advance storage group, storage group HB, associated with track switch SW1, is provided for simplicity of description, and that certain additional advance storage groups (not shown) are assumed, as required, to be in advance of advance storage group HB.

In addition to performing the above mentioned functions, it is further provided, in accordance with the present invention, to utilize the automatic switching system to transfer and store the address of the track fullness detecting unit selected for each railway car cut in accordance with the progress of that cut from the crest of the hump to its designated storage track, and to further connect the selected unit to the designated storage track so as to interrogate the analog voltage signal at two preselected instances during the progress of the railway car cut in classification.

The first connection of the selected track fullness detecting unit to the designated storage track is for the purpose of operating the relay logic circuit of the analog voltage to digital code converter F1 to obtain an actual distance to coupling registration for the particular railway car cut, and secondly to charge the operational amplifier O1 of the motion detector circuit F2. The second connection of this unit to the designated storage track is to provide a value of the analog voltage signal to be compared with that stored on the operational amplifier O1 so as to investigate the motional status on the designated storage track for that railway car cut. If motion is detected when this second interrogation is performed, one condition then exists wherein the actual distance to coupling registration, as determined from the first interrogation, is unusable for car retarder control purposes. Other conditions wherein the actual distance to coupling registration is unusable for control purposes are insufficient time lapse, between interrogations, to determine the motional status of the storage track, and the fact that the designated storage track may be filled to capacity.

A bank of storage relays BSP is illustrated in FIG. 1N and is provided for each storage track to supply a stored distance to coupling registration, for each cut, which can be used for controlling the associated retarders if any condition is found to exist wherein the actual distance to coupling, for the cut, is unusable.

It is then provided to cause selection between the actual and stored registrations of the distance to coupling by proper energization of either relay TTN (shown in FIG. 1L) or relay STN (shown in FIG. 1M) respectively in accordance with the conditions found to exist when the second interrogation of the analog voltage signal, from the entrance end of the storage tracks, is performed.

The stored registration of the distance to coupling associated with any railway car cut is established by counting the number of cars in the preceding car cut, designated for the same storage track, and subtracting this car count from the selected distance to coupling registration for that preceding cut. This then is the code established on the storage relays BS2P through BS8P, shown in FIG. 1N.

The selected distance to coupling registration, either actual or stored, is then applied as an input to an analog computer RSC, shown in block form in FIG. 1H, along with the various other factors that affect the free rolling movement of a railway car cut, among these factors being the weight and rolling resistance of the cut.

In accordance with the present invention any suitable type of analog computer may be employed but for convenience such computer may be considered of the type described in the U.S. application of Auer et al., Ser. No. 782,153, filed Dec. 22, 1958 and wherefrom the computed output is a voltage analog of the railway car cut speed at which the various group car retarders GR should be operated to an open or nonbraking position so as to release the braking on a car cut within the retarders.

Therefore, this computer is referred to as the release speed computer RSC.

To provide that a single release speed computer RSC can be employed to successively compute the release speeds for a plurality of railway car cuts, a voltage storage system is provided which consists of the following: a plurality of voltage storages VS, shown in FIG. 1H, which may be of any suitable form such as operational amplifier, etc., for successively storing the voltage analog of the computed release speeds for successive railway car cuts; voltage storage relays VSR, shown in FIG. 1D, for selectively choosing a vacant voltage storage upon which each computed release speed analog voltage is to be stored; and address storages AS, shown in FIG. 1C and 1D for registering the address of the voltage storage upon which each computed release speed analog voltage is stored until this release speed information is required by a group retarder upon detection of the associated railway car cut at the entrance end of this group retarder. More specifically, each address storage AS contains a plurality of relays energized in various combinations dependent upon which voltage storages VS are utilized.

The automatic switching system, which was described above, is then further utilized to transfer the storage address of the computed release speed analog voltage at which each car cut should exit from its associated group car retarder, until this release speed information is required, as mentioned previously, by the retarder.

As mentioned earlier, it is sometimes necessary to make certain manual corrections to the stored distance to coupling registration, for example, when it is observed that a car cut stops short of its desired coupling point. However, it has been noted that some hump operators will deliberately extend the stored distance to coupling registration for the next similarly destined car cut so as to drive down this "stopped short" car cut. Referring to FIG. 1P of the accompanying drawing, certain preventive circuits, which include among other things light repeater relays EP, are provided to prevent such manual extensions of this stored distance to coupling registration, unless such extensions are necessary to maintain automatic operation of the system.

Having thus described the general organization of the system, mored etailed consideration of the organization will be given upon consideration of the mode of operation of the system under typical operating conditions.

*Operation*

Before considering a detailed description of the operation of the system, it will be assumed that the classification yard has been idle for some time. Thus, all previously classified car cuts have arrived at their designated coupling locations on the various storage tracks of the yard. Furthermore, it is assumed that all relays of the circuit organization are initially in a deenergized or dropped away position except shunt track relay 1TS which is constantly energized in the usual manner by a track battery (not shown) and is only deenergized when a railway car cut occupies the detector track circuit extending, for example, between points O and P in FIG. 1B. In addition, cancel relay CAN is also energized, as illustrated in FIG. 1S, by a circuit extending from (+), through back contact 15 of a slow pick up relay CTE and to (−).

To consider specifically the circuit organization and the mode of operation of the system upon passage of railroad car cuts, it will be assumed that the automatic interrogation push button A1PB, shown in FIG. 1P, has been momentarily depressed, for reasons to be discussed hereinafter and that the destination code, for the first railway car cut to be released from the hump crest L, has been established in the first advanced storage group (not shown) of the automatic switching system.

Since the system has been idle for some time, the destination code for this first railway car cut successively advances, as is described in detail in the above mentioned patent to Brixner et al. Patent No. 2,700,728, towards the advanced storage group HB illustrated in FIG. 1A. Relays HBTN and HBSD then become energized so as to permit transfer of this destination code into the advance storage group HB. Furthermore, it will be noted, by referring to FIG. 1E, that relay HBTN is provided with a stick circuit, in addition to those required, for example, by the Brixner et al. Patent No. 2,700,728, which includes a back contact of relay HD. This stick circuit causes the destination code, for the first car cut, to remain in advance storage group HB until a first interrogation of storage truck ST1 has been completed, as will be dicussed later.

Relay BU1 now becomes energized, as shown in FIGS. 1E and 1F, by a circuit extending from (+), through back contact 16 of relay TU1, along wire 17 between FIGS. 1F and 1E, through back contact 18 of relay AU1, through the back contacts 19 and 20 of relays BU2 and BU3 respectively, through the front contacts 21 and 22 of relays HBTN and HBSD respectively, and to (−). Thus, track fullness detecting unit UN1 has been selected to be associated with this first railway car cut. Furthermore, the address of this selected track fullness detecting unit UN1 is stored in the advance storage group HB as long as the destination code for the first railway car cut is present in this storage group, by a stick circuit extending from (+), through front contact 23 of relay HBSD, through a front contact 24 of the energized unit selector relay BU1 and to (−).

At the same time, a crest route relay CR is energized in accordance with the designated storage track for this first railway car cut. Thus, if it is assumed that this first cut is designated for storage track ST1, crest route relay CR1 is energized, as illustrated in FIGS. 1K and 1L, by a circuit extending from (+), through front contact 25 of relay HBSD, through certain front and back contacts of the destination storage relays HBCS, of the advance storage group HB, shown in FIGS. 1K and 1L, and to (−). This energization of these code storage relays HBCS is in accordance with the destination code established by the hump operator and is fully described in the above mentioned patent to Brixner et al. Patent No. 2,700,728. Thus, for the first railway car cut, the code storage relay HBCS are energized in that combination necessary to properly energize relay CR1. Referring to FIG. 1K of the accompanying drawings, it will be noted that each crest route relay has a diode DIR connected in series in its energizing circuit. These diodes DIR are included to prevent pickup of more than one crest route relay for each destination code.

Conditions are now completed for connection of the selected track fullness detecting unit UN1 to the designated storage track ST1. Referring to FIG. 1C of the accompanying drawings, the analog voltage signal, from the entrance end of storage track ST1, is fed along wires 26 and 28 between FIGS. 1C and 1K, through front contacts 29 and 30 of crest route relay CR1, through front contacts 31 and 32 of unit selector relay BU1, along wires 33 and 34, between FIGS. 1K and 1R to the input step-up transformer T1 of the track fullness detecting unit UN1.

It should be pointed out at this time that, in practice, the voltage drops, across the contacts of the various relays connecting the selected track fullness detecting unit to the designated storage track, may be an appreciable portion of the existing analog voltaeg signal, therefore it may be advisable, in practice, to connect a step up transformer directly to the entrance end of each storage track and it is understood that such connection could be performed without in any manner departing from the spirit and scope of the present invention.

Bias cut out relay BCO, illustrated in FIG. 1S, is now energized by a circuit extending from (+), in FIG. 1R through either the back contact 35 of stepping relay B1, or back contact 36 of stepping relay B3, along wire 36A between FIGS. 1R and 1S, through the front contact 37 of unit selector relay BU1, and to (−). This energization of relay BCO then causes a certain amount of biasing voltage to be applied in accordance with the known track distance between points R and S of FIGS. 1B and 1C, as additional analog voltage input to the track fullness detecting unit UN1. Thus, bias supply 38, shown in FIG. 1K, supplies this necessary biasing voltage through front contact 39 of relay CR1, through the front contact 40 of relay BCO, through the front contact 41 of relay BU1, along wire 42, between FIGS. 1K and 1R, to the input of track fullness detecting unit UN1. This biasing voltage then appears across resistor 27 so as to establish a reference level for operation of full wave rectifier and filtering network 13 and 14 respectively.

It is now apparent that the total analog input voltage to the detecting unit UN1 is indicative of the total distance extending from the exit end of group retarder GR1 to the rear axle of the last car cut (point U in FIG. 1C) having coupled on storage track ST1. It is this total analog input voltage which is converted in digital data as described in the above mentioned application to K. H. Frielinghaus, Ser. No. 22,191.

However, the relay logic circuit of the analog voltage to digital code converter F1, contained in the track fullness detecting unit UN1, is not permitted to operate at this time. A certain delay is caused by an anticipatory picking up of release relay REL, shown in FIG. 1S, which removes the electric current needed for proper operation of the relay logic circuit. This release relay REL therefore can be considered as performing a function corresponding to the manual code switch S1 illustrated in FIG. 1C of the above mentioned Frielinghaus application, Ser. No. 22,191. Thus, release relay REL is energized upon proper energization of crest route relay CR1 by a circuit illustrated in FIG. 1S, extending from (+), through the front contact 43 of relay CR1, through back contact 44 of slow pick up relay CTE, through front contact 45 of unit selector relay BU1, and to (−).

However, after a short time delay, dependent upon the pick up time of relay CTE, which is employed to make sure the previous registration of the relay logic circuit is completely cancelled, this relay CTE becomes picked up by a circuit extending from (+), through front contact 43 of relay CR1 and to (−). The release relay REL now is dropped away and the relay logic circuit of the analog voltage to digital code converter F1 is supplied with energizing current by way of a circuit extending from (+), through back contact 46 of relay REL, along wire 47, between FIGS. 1S and 1R, and to the relay logic circuit.

As is described in detail in the U.S. application to K. H. Frielinghaus, Ser. No. 22,191, the decoding D relays, shown in FIG. 1R, now establish a digital registration of the actual distance the first railway car cut must travel to its coupling point on storage track ST1 after leaving the associated group retarder GR1. Thus, certain of the relays D1 through D5 will be energized and certain of these relays will be deenergized depending upon the value of the analog voltage signal received from the entrance end S of storage track ST1 and the biasing voltage supplied by bias supply 38. The relay logic circuit of the track fullness detecting unit UN1 is so circuited that upon complete set up of the actual distance to coupling registration by the decoding D relays, the stepping B relays, B1 through B3, assume operating positions wherein relay B1 is energized, relay B2 is deenergized and relay B3 is energized. Assuming that the distance to coupling registration has been completed it is seen by referring to FIGS. 1R and 1S, of the accompanying drawings, that the condition now exists wherein the energizing circuit for bias cut out relay BCO is open, thus causing drop away of this relay, and therefore removing the biasing voltage from the input to the track fullness detecting unit UN1.

The operational amplifier O1, contained in the motion detector circuit F2 of the track fullness detecting unit UN1, now becomes charged to the new value of the analog voltage to this detecting unit UN1; i.e. without any biasing voltage. After this analog voltage is fully charged on operation amplifier O1, the motion detector relay MD becomes deenergized for reasons discussed in detail in the above mentioned application to K. H. Frielinghaus, Ser. No. 22,191 and by referring to FIG. 1S of the accompanying drawings it is seen that conditions now exist wherein the energizing circuit for cancel relay CAN is opened.

Upon drop away of relay CAN, hold relay HD now becomes energized, by a circuit extending from (+), through back contact 48 of relay CAN, through front contact 49 of unit selector relay BU1 and to (−), thus storing this value of the analog input voltage to unit UN1 (without biasing voltage) on the operational amplifier O1.

Referring now to FIG. 1E of the accompanying drawings, this picking up of relay HD causes the stick circuit for transfer relay HBTN to be opened thus dropping this relay and thereby setting up the condition wherein it is now permissible for the destination code for the first railway car cut to be advanced into storage group HA of the automatic switching system.

Relays HATN and HASD now become energized in a manner similar to that described for relays HBTN and HBSD so that the destination code for this first railway car cut is subsequently transferred into storage group HA. For simplicity, it is assumed that such transfer occurs along wire 49A in FIG. 1A. When this destination code has come to rest in storage group HA, track switch SW1 is then positioned, as described in the Brixner et al. Patent No. 2,700,728 so as to route this first railway car cut onto group track 11; that is, track switch SW1 is operated to its assumed "normal" position. Such control of track switch SW1 is diagrammatically illustrated by wire 49B extending between storage group HA, in FIG. 1A, and switch control SC1, in FIG. 1B. Furthermore, the advance storage group HB is now conditioned to receive the destination code for a second railway car cut when this destination code is established by the hump operator.

The picking up of hold relay HD furthermore causes completion of the energizing circuit for time delay relay TE as is shown in FIG. 1S, extending from (+), through front contact 50 of relay HD and to (−). From a practical viewpoint, there is a minimum car velocity that need be detected on the storage tracks. The pick up time for relay TE is therefore so chosen as to furnish an indication that the time lapse between interrogations necessary to detect this minimum velocity, has transpired.

With relays HATN and HASD in picked up positions the address of the selected track fullness detecting unit UN1 is then transferred to relay AU1 by the picking up of this relay AU1 with a circuit shown in FIG. 1A and extending from (+), through front contact 51 of relay BU1, through front contacts 52 and 53 of relays HATN and HASD respectively, and to (−). As in the advanced storage group HB, the selected unit selector relay AU1 is provided with a stick circuit extending through front contact 54 of relay AU1 and front contact 55 of storage detector relay HASD, so as to store this unit address until the first railway car cut advances onto the detector track circuit extending between points O and P in FIG. 1B.

Referring now to FIGS. 1A and 1H of the accompanying drawings, when weight detector WD and rolling resistance detector RD are actuated by this first railway car cut, they provide registrations of the weight and rolling resistance classification respectively of this first cut. This weight and rolling resistance information is then entered along lines 56 and 57 respectively, into the rolling resistance and weight transfer and storage apparatus WRS, illustrated in FIGS. 1A and 1H, wherein this information is stored until this first railway car cut enters the detector track circuit, beginning at point O in FIG. 1B, at which time this weight and rolling resistance information, associated with this first cut, is transferred into the computer RSC along lines 58 and 59 respectively. Furthermore although the embodiment of the present invention shown herein is particularly concerned with control of the group retarders, the rolling resistance and weight information as derived from rolling resistance detector RD and weight detector WD would normally also be used, as illustrated in FIG. 1A, to control hump retarder HR. Thus, the weight and and rolling resistance for the first car cut is fed directly to the hump retarder control apparatus HRC, which may be of any suitable form, for controlling hump retarder HR in accordance with the weight and rolling resistance of a car cut passing through it.

When this first railway car cut enters hump retarder HR, it then is acted upon; i.e. retarded, in accordance with the rolling resistance and weight of the cut. Thus, hump retarder HR can be considered as providing a "rough" degree of retardation to the cuts being classified for the purpose of maintaining a desirable separation between distinct car cuts so as to permit proper operation of the automatic switching system employed in the present invention.

The system now remains in this operating condition unitil this first car cut enters the detector track circuit extending between points O and P, in FIG. 1B. When this occurs, shunt track relay 1TS becomes deenergized and the destination code associated with this first car cut is transferred through the assumed "normal" contact of track switch control SC1, as is fully described in the above mentioned Brixner et al. Patent No. 2,700,728, into advance storage 2C; the first advance storage group associated with track switch SW2. For simplicity, it is assumed that such transfer occurs along wire 59A, between FIGS. 1A and 1B. In addition, the energizing circuit for back track repeater relay BTP is now completed and extends from (+), in FIG. 1B, through back contact 60 of relay 1TS, and to (—).

Transfer relay TN, shown in FIG. 1F, is now picked up by an energizing circuit extending from (+), through front contact 61 of relay BTP, along wire 61A between FIGS. 1F and 1E, through back contact 63 of transfer relay HATN, through front contact 64 of relay HASD, along wire 64A between FIGS. 1E and 1F, through back contacts 65, 66 and 67 of unit selector relays TU3, TU2 and TU1 respectively and to (—). This then permits transfer of the track fullness detecting unit address into this third group of unit selector relays TU. Thus, relay TU1 is energized by a circuit extending from (+) in FIG. 1E, through front contact 68 of relay AU1, along wire 69 between FIGS. 1E and 1F, through front contact 70 of relay TN, and to (—). Subsequently, unit selector repeater relay TU1P, shown in FIG. 1Q, is energized by the obvious circuit extending from (+) in FIG. 1B, through contact 71 of relay TU1 along wire 72, between FIGS. 1B and 1Q, and to (—).

A route relay, corresponding to the designated storage track for the particular railway car cut, is also energized at this time. For the first railway car cut, route relay R1 is energized, as is illustrated in FIG. 1H of the accompanying drawings, by a circuit including various contacts of the destination code storage relays, of the advanced storage group 2C, in a manner similar to that previously described for energization of crest route relays CR1. Furthermore, the energizing circuits for the various route relays include a back contact of a corresponding track relay TR, the use of which will be explained in detail at a later time. When route relay R1 is picked up it remains up as long as the first car cut occupies the detector track circuit.

Storage track ST1 is now again connected to the selected track fullness detector unit UN1. This connection extends from the entrance end S of storage track ST1 via wires 26 and 28 in FIG. 1C to the corresponding wires 26A and 28A in FIG. 1L, along wires 26A and 28A between FIGS. 1L and 1Q, through front contacts 73 and 74 of route relay R1, through front contacts 75 and 76 of unit selector repeater relay TU1P, along wires 33 and 34 between FIGS. 1Q and 1R, to the input step up transformer T1 of track fullness detecting unit UN1. The existing value of the analog voltage signal, from the entrance end of the storage track ST1, is then compared with that previously stored on operational amplifier O1. Furthermore, with route relay R1 picked up, relay MD-TE (shown in FIG. 1T) is now energized by a circuit extending from (+), through front contact 77 of relay R1, and to (—).

If these two compared analog voltage signals are of the same magnitude, a "no motion" indication will be received; i.e. the motion detector relay MD will be deenergized. However, if these two analog voltage signals are of unequal magnitude, the motion detector relay MD will be picked up, as is fully described in the above mentioned application of K. H. Frielinghaus, Ser. No. 22,191, so as to indicate that motion has occurred, between interrogations, on storage track ST1. Furthermore, in accordance with the present embodiment shown, motion detector relay MD is provided with a stick circuit which extends from (B+), in FIG. 1S, through front contact 78 of relay MD, along wire 79, between FIGS. 1S and 1T, through front contact 80 of unit selector repeater relay TU1P, through front contact 81 of relay MD-TE, and through resistor 82 to ground. Thus, relay MD-TE renders this stick circuit effective only after a preselected time interval, as determined by the pick-up time of relay MD-TE, has transpired, thus preventing a retainment of motion detector relay MD when spurious instantaneous pick up of this relay MD occurs due to instantaneous current surges, etc. The energizing circuit for motion detector relay MD, which incidently includes (B+) is fully described in the above mentioned Frielinghaus application.

Because of the assumed idle condition of the classification yard, motion detector relay MD will obviously be deenergized and thus indicate a "no motion" condition, when the second interrogation of storage track ST1 is performed. It is furthermore assumed that time delay relay TE has been picked up, and that relay ETK is deenergized, thus indicating that storage ST1 is not filled to capacity.

Relay TTN (of FIG. 1L) is now energized by a circuit extending from (+), in FIG. 1S, through back contact 83 of relay MD, through back contact 84 of relay ETK, through front contact 85 or relay TE, along wire 86, between FIGS. 1S and 1T, through front contact 87 of unit selector repeater relay TU1P, through front contact 88 of relay MD-TE, along wire 89, between FIGS. 1T and 1M, through back contact 90 of relay STN, through back contact 91 of relay CP, along wire 92, between FIGS. 1M and 1L, and to (—). The actual distance to coupling registration as determined by the decoding D relays, located in the relay logic circuit of the analog voltage to digital code converter F1, shown in FIG. 1R, is now passed along on wire group 93 between FIGS. 1R and 1L, through front contacts 94 of relay TTN, along wire group 94A between FIGS. 1L and 1M, through back contacts 95 of relay CPPP, to counting relays BS3 through BS8; that is, these counting relays are energized in accordance with the actual distance to coupling registration established on the decoding D relays. This distance to coupling code is then stored on these counting relays BS until treadle TRD is actuated by the first wheel of this first railway car cut.

Referring now to FIG. 2 of the accompanying drawings, a code chart is illustrated which indicates the assumed manner in which the decoding D relays, located in the relay logic circuit of the analog voltage to digital code converter F1, are energized in accordance with the total input voltage to track fullness detecting unit UN1, and furthermore illustrates the corresponding energization of counting relays BS. For example, if the distance to coupling registration is indicative of twenty vacant car spaces on a particular storage track, decoding relays $D_1$, $D_3$, and $D_4$ would be energized, while decoding relays $D_2$ and $D_5$ would be deenergized. With reference to the above mentioned application, Ser. No. 22,191, the type of code illustrated for the decoding D relays, could be realized by having a maximum reference voltage indicative of six-four cars and merely inverting those contacts of the decoding D relay associated with the resistive voltage divider network shown in FIG. 1C of this application, Ser. No. 22,191.

For the purpose of simplifying the disclosure of the present invention, it will be assumed that there exists an actual distance to coupling of twenty vacant car spaces when the first interrogation of storage track ST1 is performed, for the first railway car cut. Thus, when the assumed distance to coupling registration of twenty vacant car spaces appears on the counting relays BS, counting relays BS3, BS5, BS6 and BS8 will be energized while the remaining counting relays will be deenergized.

Referring now to FIG. 2, it will be noted that the counting relays are energized according to the reflected binary coding sequence; that is, only a single relay operation is required for each incremental change of the distance to coupling registration. The merit of converting to this type of coding has been well explained in the prior art and by referring to FIG. 1R, of the accompanying drawings, it is noted that in the present invention, such conversion is acomplished by relay contacts of the decoding D relays, and without resorting to complex electronic circuits.

Figure 1G:
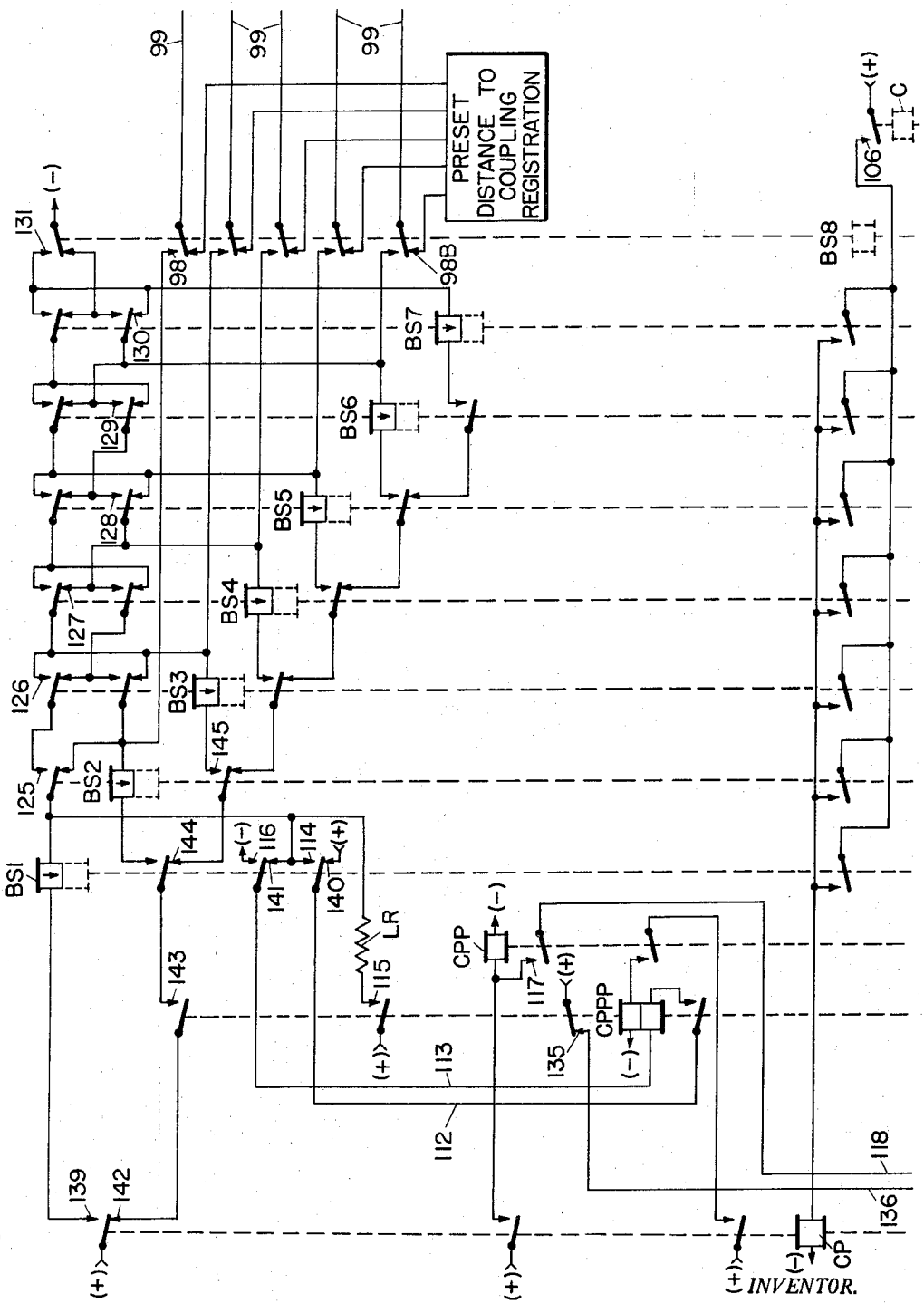

When the first actuation of treadle TRD occurs, relay TD is energized by a circuit, illustrated in FIGS. 1N and 1H, and extending from (+), in FIG. 1N, through closed contact 96 of treadle TRD, along wire 97, between FIGS. 1N and 1H, and to (—). Referring to FIG. 1G, the distance to coupling registration (twenty car spaces), as stored on the counting BS relays, is now transferred to the release speed computer RSC via front contacts 98 of counting relay BS8, wire group 99, between FIGS. 1G and 1H, front contacts 100 of relay TD, and back contacts 101 of lockout relay LO, thus causing the computer input relays BD to be energized in certain combination dependent upon the actual distance to coupling registration as initially set up by the decoding D relays. Relay TD is furthermore provided with a stick circuit which maintains relay TD picked up as long as this first railway car cut occupies the detector track circuit; i.e., relay TD is maintained in a picked up position by a circuit extending from (+), through back contact 102 of shunt track relay 1TS, through its own front contact 103, and to (—). It should be understood at this time that the illustration of input relays BD, to register the input to computer RSC was included merely for simplicity and that various other apparatus may be used dependent upon the type of analog computer selected.

In the event that no distance to coupling information is registered in the counting BS relays (for the assumed code chart, relay BS8 would be in a deenergized position), when these counting relays are connected to release speed computer RSC, a preset distance to coupling registration, dependent upon the requirements of the classification yard, is available at back contacts 98B of relay BS8. Although not shown in detail, this preset registration could be obtained by simply connecting certain of these back contacts 98B to the negative terminal (—) of a suitable source of current.

After the distance to coupling registration has been placed on the computer input relays BD, the slow pick up lock out relay LO is energized, as illustrated in FIG. 1H, by a circuit extending from (+), through front contact 104 of relay TD, and to (—), and thus disconnects the counting BS relays from the release speed computer RSC. After the counting relays have been disconnected from the computer input by the picking up of lockout relay LO, as described above, the number of cars in this first railway car cut is counted. From the above it is obvious that the pick up time of lock out relay LO is long enough to permit complete transfer of the counting relay registration to release speed computer RSC, but, short enough to disconnect the computer RSC from the counting relays before the registration thereof is altered by the car count.

Before considering the details of the operation of the car counting system, as utilized in the embodiment shown herein, it is first necessary to discuss the construction of the counting BS relays. Referring now to FIGS. 1G and 1M of the accompanying drawings, counting relays BS1 through BS7 are equipped with both upper and lower windings. The lower windings, shown in FIGS. 1M, when energized, are used for picking up the associated counting relay and the upper windings, illustrated in FIG. 1G, when energized, are used to knock down the associated counting relay. Furthermore, if both upper and lower winding of a particular counting relay are simultaneously energized, the relay will assume its deenergized position.

*Car counting*

Referring now to FIG. 1M of the accompanying drawings, a car counter 105, which may be of any suitable form, includes a car count relay C which is picked up for a short interval of time for each car counted in accordance with the actuation of treadle TRD and the subsequent energization of wire 105A, extending between FIGS. 1N and 1M. In addition, car count repeater relays CP, CPP and CPPP, shown in FIG. 1G, are provided to (1) disconnect the counting BS relays from the decoding D relays at the start of each car counting operation, (2) decrease the distance to coupling registration of the counting BS relays, associated with each car cut, by the number of cars in that cut, and (3) transfer the resulting registration to the storage relays BSP, associated with the designated storage track, so as to provide a stored distance to coupling registration for the next similarly destined car cut.

To illustrate the operation of this car counting system, it will be asumed that the counting relays BS have established a registration indicative of the assumed twenty vacant car spaces on storage track ST1 and that there are four cars in this first railway car cut. Thus, counting relays BS3, BS5, BS6 and BS8 will be energized while the remaining counting relays will be deenergized.

When car count relay C is first energized, so as to count the first car of this first railway car cut, repeater relays CP, CPP and CPPP are energized in sequence. For example, relay CP is energized by a circuit extending from (+) in FIG. 1G, through front contact 106 of car count relay C, through a front contact of at least one of the energized counting relays, and to (—). The picking up of relay CP causes knock down of relay TTN, by the opening of its back contact 91 (see FIG. 1M), thus disconnecting the counting BS relays from the decoding D relays of the analog voltage to digital code converter F1.

With repeater relay CP picked up, conditions further exist for the energization of relay BS1 provided of course that the upper knock down winding of this relay BS1 is not simultaneously energized. Referring now to FIG. 1G and recalling the assumed registration of twenty vacant car spaces, it is noted that the upper knock down winding of BS1 is not connected to the negative terminal of a suitable current source and therefore relay BS1 is now picked up by a circuit extending from (+), through front contact 107 of relay CP, and to (—).

When relay CPPP picks up, relay STN, shown in FIG. 1M, is now energized by a circuit extending from (+), through front contact 108 of relay CPPP, and to (—). Furthermore, relay STN is provided with a stick circuit including its own front contact 109, wire 110, between FIGS. 1M and 1N, and the front contact 111 of route relay R1, so that relay STN will remain in a picked up position as long as this first railway car cut occupies the detector track circuit extending between points O and P in FIG. 1B. In addition, repeater relay CPPP is provided with a lower hold winding, so as to maintain this repeater relay CPPP in a picked up position, effective as long as wires 112 and 113, in FIG. 1G, are respectively connected to opposite terminals of suitable current sources; i.e. (+) and (−) respectively. Thus, with counting relay BS1 picked up, wire 112 is connected to (+) through front contact 114 of relay BS1, current limiting resistor LR, and front contact 115 of repeater relay CPPP, while wire 113 is connected to (−) through front contact 116 of relay BS1, so that relay CPPP is stuck in a picked up position.

Repeater relay CPP is also provided with a stick circuit extending through its own front contact 117, along wire 118 between FIGS. 1G and 1N, through front contact 119 of relay R1, through back contact 120 of storage relay BS7P, through back contact 121 of relay BS8P, and to (+), so that this repeater relay CPP is retained in a picked up position until the modified distance to coupling registration has been placed on the storage relays.

When car count relay C assumes its deenergized position, thus completing the first car count, relay CP is also deenergized, and will cause energization of relay BS2 in agreement with the code chart of FIG. 2, provided of course the upper knock down winding of this relay BS2 is not simultaneously energized.

Referring now to FIG. 1G of the accompanying drawings, it will be noted that the knock down winding of relay BS2 is not connected to the negative terminal of a suitable current source and therefore cannot be energized. Thus, relay BS2 is now picked up by a circuit extending from (+), in FIG. 1M through back contact 122 of relay CP, through front contact 123 of relay CPPP, through front contact 124 of relay BS1, and to (−). This picking up of relay BS2 now interrupts or breaks the hold circuit for relay CPPP, thus causing this relay CPPP to drop; i.e., no current flows in the lower hold winding of relay CPPP since front contact 114 of relay BS1 is now connected directly to (−), in FIG. 1G, through front contact 125 of relay BS2, through front contact 126 of relay BS3 through back contact 127 of relay BS4, through front contacts 128 and 129 of relay BS5 and BS6 respectively, through back contact 130 of relay BS7, and through front contact 131 of relay BS8.

Those counting relays which have been energized remain in picked up positions by reason of the obvious stick circuit, shown in FIG. 1M and including front contact 132 of relay CPP. Thus, with relay CPPP dropped away, the code present on these counting relays, nineteen vacant car spaces, is now transferred to the storage relays BSP, of FIG. 1N, through back contacts 95 of relay CPPP, through front contacts 133 of relay STN, along wire group 134 between FIGS. 1M and 1N, through front contacts 119 of route relay R1, and to the associated minuses. Since storage relay BS8P is now provided with a stick circuit extending from (+), in FIG. 1G, through back contact 135 of relay CPPP, along wire 136 between FIGS. 1G and 1N, through front contact 119 of route relay R1, through back contact 137 of track relay 1TR, through its own front contact 138, and to (−), the remaining storage relays, energized in accordance with the registration of nineteen vacant car spaces, are provided with stick circuits, obvious in FIG. 1N, so that this registration of nineteen vacant car spaces is stored on storage relays BS2P through BS8P. After this registration transfer has been completed the stick circuit for repeater relay CPP is now broken, at storage relay BS8P, thus causing drop away of relay CPP.

Referring to FIGS. 1M and 1N, the counting BS relays are now retained in the existing registration of 19 vacant car spaces by energizing circuits, extending through back contacts 95 of relay CPPP, through front contacts 133 of relay STN, along wire group 134 between FIGS. 1M and 1N, through front contacts 119 of relay R1, through various stick contacts of the associated storage relays BSP, and to (+).

When car count relay C picks up in response to the second car of this first railway car cut, repeater relays CP, CPP and CPPP are sequentially energized as was described above.

However, when repeater relay CP is picked up for this second car, relay BS1 is now knocked down since its upper knock down winding is now energized by a circuit extending from (+), in FIG. 1G, through front contact 139 of relay CP, through front contacts 125 and 126 of relays BS2 and BS3 respectively, through back contact 127 of relay BS4, through front contacts 128 and 129 of relays BS5 and BS6 respectively, through back contact 130 of relay BS7, through front contact 131 of relay BS8, and to (−). This knocking down of relay BS1 now shifts the holding circuit for repeater relay CPPP; that is, causes wire 112 to be connected to (+) through back contact 140 of relay BS1 and causes wire 113 to be connected to (−), through back contact 141 of relay BS1, and through the above mentioned contacts 125 through 131 of relays BS2 through BS8 respectively.

When repeater relay CPPP is picked up, the distance to coupling registration as stored on the storage relays BSP is now cancelled; i.e. the stick circuits for the energized storage relays are opened, by the opening of back contact 135 of relay CPPP in FIG. 1G, and repeater relay CPPP is now provided with its above described stick circuit.

After this second car count; i.e. car count relay C deenergized, repeater relay CP will be deenergized. When this occurs, relay BS3 will now be knocked down since its upper knock down winding is now energized by a circuit extending from (+), through back contact 142 of relay CP, through front contact 143 of relay CPPP, through back contact 144 of relay BS1, through front contact 145 of relay BS2, and to (−) through the above described circuit including contacts 127 through 131 of relays BS4 through BS8 respectively. Referring now to FIG. 2 of the accompanying drawings, the code or registration now existing on the counting BS relays is indicative of eighteen vacant car spaces.

When relay BS3 is knocked down, the lower holding winding on relay CPPP is now ineffective and this relay CPPP is therefore knocked down with an associated transfer of the present distance to coupling registration from the counting BS relays onto the storage relays BSP. Furthermore, repeater relay CPP is again knocked down since it loses its stick circuit while this distance to coupling registration transfer is being completed.

From the above it is apparent that repeater relay CPPP is dropped away only after each car, in a cut, is counted; that is, when the proper counting BS relay is actuated, either picked up or released, to register a car count, the lower holding winding on relay CPPP is ineffective. Relay CPPP thus detects that the proper counting BS relay is actuated for each car count and therefore insures the proper sequential operation of the counting BS relays during a car count operation.

When the third and fourth cars of this first railway car cut are counted into the system, the final registration stored on the storage relays BSP is indicative of sixteen vacant car spaces on storage track ST1. As previously mentioned, after each car was counted in, the modified distance to coupling registration was stored on the storage relays BSP by means of stick circuits previously described. Furthermore, after this first car cut leaves the detector track circuit, the final registration is stored by completion of a stick circuit for relay BS8P extending from (+) in FIG. 1N, through back contact 119B of route relay R1, through back contact 137 of relay 1TR, through front contact 138 of relay BS8P, and to (—). This stored distance to coupling registration will then be used, for car retarder control purposes, if, on the second interrogation of storage track ST1 for the next similarly destined cut, it is discovered that motion or some other condition exists wherein the actual distance to coupling registration, as determined by the first interrogation for that cut, is unusable.

Having received the distance to coupling registration, the weight classification and the rolling resistance classification for the first railway car cut, the release speed computer RSC now provides as output, a voltage analog of the speed at which this first relay car cut should exit from group retarder GR1. For reasons previously mentioned this computed release speed analog voltage is then fed along output wire 146, in FIG. 1H, to the first vacant voltage storage VS. Because of the assumed idle position of the classification yard, the entrance of this first railway car cut onto the detector track circuit, between points O and P of FIG. 1B, causes voltage storage relay VSR1, shown in FIG. 1D, to be energized by a circuit extending from (+), through front contact 147 of back track repeater relay BTP, through the back contacts 148, 149, 150 and 151 of relay VSR4P through VSR1P, respectively, to (—). Furthermore, relay VSR1 is provided with a stick circuit, including front contact 147 of relay BTP and its own front contact 152, so that this voltage storage relay VSR1 is maintained in a picked up position as long as the first railway car cut occupies the detector track circuit. In addition, voltage storage repeater relay VSR1P is subsequently energized by a circuit extending from (+), through front contact 153 of relay VSR1 and to (—). Referring to FIG. 1D, these repeater relays VSR1P through VSR4P are provided with a lower knock down winding which when energized, cause the relay to assume its deenergized position, for reasons to be discussed later.

Output wire 146, from the release speed computer RSC, is now connected to voltage storage VS1 through front contact 154 of relay VSR1, so that the computed release speed analog voltage for the first railway car cut is now stored on voltage storage VS1.

At the same time, the weight classification for this first railway car cut is stored on weight storage WS1 by completion of a circuit extending from the rolling resistance and weight transfer and storage apparatus WRS, shown in FIG. 1H, along wire 155, between FIGS. 1H and 1D, through front contact 156 of the voltage storage relay VSR1, to the weight storage WS1, wherein the weight classification for this first railway car cut is stored until it is necessary for the control of group retarder GS1. Each of these weight storages WS may be of any suitable form and may include, for example, a plurality of relays energized in various combinations in accordance with the weight classification for each distinct railway car cut.

Referring now to FIG. 1D, the energization of voltage storage relay VSR1 also causes energization of the first address storage AS2C wherein the address of the computed release speed analog voltage for the first railway car cut is registered; that is, a registration is performed to indicate upon which voltage storage VS this first computed analog is stored. Specifically, this picking up of voltage storage relay VSR1, causes pick up of relay AS2C1 by completion of the energizing circuit extending from (+), through front contact 157 of relay VSR1, through the "normal" contact of track switch control SC1, through the front contacts 158 and 159 of relays 2CTN and 2CSD, respectively, and to (—), and of relay AS2C2 by completion of a similar energizing circuit including front contact 160 of relay VSR1, and front contacts 161 and 162 of relays 2CTN and 2CSD respectively. Thus, the energization of both relays AS2C1 and AS2C2 is indicative of the condition wherein the computed analog speed voltage is stored on voltage storage VS1. Furthermore, relays AS2C1 and AS2C2 are provided with a common stick circuit, including front contact 163 of relay 2CSD so that the address of the computed analog voltage, associated with this first railway car cut, will remain in address storage AS2C as long as the destination code for this first cut occupies the advanced storage group 2C of the automatic switching system.

Because of the assumed idle condition of the classification yard, the destination code for this first railway car cut now advances through advanced storage group 2B and comes to rest in storage group 2A shown in FIG. 1C and 1B. When this occurs, track switch SW2 is then operated to its assumed "reverse" position by proper operation of control SC2, in accordance with the assignment of this first railway car cut to storage track ST1.

Simultaneously with this advancement of the destination code, the address of the computed analog voltage for this first railway car cut is advanced along wire group 163A, between FIGS. 1D and 1C, through address storage AS2B, to address storage AS2A; that is, relays AS2A1 and AS2A2 are both energized corresponding to the energization of both relays AS2C1 and AS2C2 in the address storage AS2C.

When this first railway car cut is detected at point Q on group track 11, relay NLDTP is energized. Subsequently, retarder storage relay 1RS1 is energized by a circuit extending from (+) in FIG. 1C, through back contact 164 of relay 1RSP, through front contact 165 of relay NLDTP, through front contact 166 of relay 2ASD, through front contacts 167 and 168 of relays AS2A1 and AS2A2 respectively, and to (—). The stored release speed analog voltage for this first railway car cut is now extracted from voltage storage VS1, and is fed along wire 169, between FIGS. 1H and 1C, through front contact 170 of relay 1RS1, along wires 171 and 172, between FIGS. 1C and 1B to the speed relay control circuits SRC and the difference amplifier DA respectively, of the group retarder control apparatus.

At the same time the weight classification for this first railway car cut is fed along wire 173 between FIGS. 1D and 1C, through front contact 174 of relay 1RS1 along wire 175 between FIGS. 1C and 1B, to the weight relays WR. It has been observed, in practice, that such weight control is advisable so as to prevent for example the "lifting out" of a light car which enters the car retarder over speed.

Referring to FIG. 1C, of the accompanying drawings, with relays 1RS1 picked up, relay 1RSP is now energized by a circuit extending from (+), through back contact 176 of slow drop away relay SD, through front contact 177 of relay 1RS1 and to (—). The release times of the retarder storage relays 1RS1 through 1RS4 are long enough to bridge the contact crossover time of relay 1RSP so that relay 1RS1 is now held in a picked up position by a stick circuit extending from (+), through front contact 178 of relay 1RSP, through its own front contact 179, and to (—).

Conditions now exist for knocking down repeater relay VSR1P by energization of its lower winding, shown in FIG. 1D, with a circuit extending from (+), through front contact 180 of relay VRS1P, along wire 181 between FIGS. 1D and 1C, through front contact 182 of relay 1RS1, through front contact 183 of relay 1RSP, and to (—).

From the above, it is apparent that repeater relay VSR1P is energized only so long as voltage storage VS1 is being utilized; and is only knocked down after the analog voltage stored on voltage storage VS1 has been extracted. Thus, if the release speed for a second car cut were computed before that associated with the first were utilized, as described above, the computed release speed analog voltage, for the second cut, would be stored on the voltage storage VS2, since relay VSR2 would become energized, when this second cut enters the detector track circuit beginning at point O in FIG. 1B, by a circuit extending from (+) in FIG. 1D, through front contact 147 of relay BTP, through back contacts 148, 149 and 150 of relay VSR4P through VSR2P respectively, through front contact 184 of relay VSR1P, through back contact 185 of relay VSR4, through back contact 186 of relay VSR1 and to (−). Subsequently, repeater relay VSR2P would be energized by a circuit extending from (+), through back contact 187 of relay VSR1, through front contact 188 of relay VSR2, and to (−), and would only be knocked down when the release speed analog voltage for the second cut is extracted from voltage storage VS2.

Generally speaking now, it is seen that each voltage storage repeater relay VSRP records that its associated voltage storage VS is being utilized and further causes any additional computed release speed analog voltages to be stored on the remaining idle voltage storages.

With this first railway car cut now situated within group retarder GR1, radar antenna RA operates as previously described in conjunction with radar equipment RAD so that the output of this radar equipment RAD is an analog of the actual velocity of this first railway car cut while in group retarder GR1. This analog quantity VA is now fed into discriminator DS.

The group retarder control apparatus now operates, as is fully described in the above mentioned application of Auer et al., Ser. No. 782,153, and causes group retarder GR1 to apply the proper amount of braking action to this first railway car cut, needed to cause "smooth" coupling between the first railway car cut and the railway cars already standing on storage track ST1.

When this first railway car cut begins to exit from group retarder GR1, relay XLDTP, shown in FIG. 1C, is energized and thereby maintains an energizing circuit for relay 1RSP through front contact 189 of relay XLDTP and front contact 177 of relay 1RS1. At the same time, slow drop away SD is energized by a circuit extending from (+), through front contact 190 of relay XLDTP, and to (−).

When the last car of this first railway car cut has passed point R in FIG. 1B, relay XLDTP will become deenergized. Since relay SD is of a slow drop away nature, relay 1RSP is now deenergized thus breaking the stick circuit for relay 1RS1 and disconnecting voltage VS1 from the group retarder control apparatus associated with group retarder GR1. At some later time, as determined by the drop away time of relay SD, electric energy (+) is again applied to back contact 176 of relay SD so as to condition the retarder storage relays 1RS1 through 1RS4 to receive the address of the next railway car cut destined for group track 11 and group retarder GR1.

In a system of this type, it is usually desirable to provide the hump operator, or some other person supervising the classification of railway car cuts, with a visual indication of the distance to coupling registration for the varous storage tracks. Thus, certain visual indicating means are illustrated in FIGS. 1J and 1P of the accompanying drawings.

Recalling now that it was initially assumed, at the beginning of the detailed description of this system, for the first railway car cut, that automatic interrogation push button AIPB was momentarily depressed, its associated repeater relay AIPBP is energized by a circuit extending from (+), in FIG. 1P, through closed contact 191 of push button AIPB, and to (−). Furthermore, relay AIPBP is provided with a stick circuit extending through its own front contact 192, along wire 193, between FIGS. 1P and 1N, through back contact 194 of relay G1, along wire 195, between FIGS. 1N and 1P, through back contact 196 of relay G2, and to (+). The operation of relays G1 and G2 are concerned with certain correction apparatus, associated with the present invention and will be discussed in detail later.

When the distance to coupling registration is received by the counting BS relays, it is then transferred along wire group 197, between FIGS. 1J and 1P, through front contacts 198 of relay AIPBP, to light relays E3 through E8, and thereby causes energization of these light relays E in accordance with the received distance to coupling registration. Thus, if the counting BS relays are energized in accordance with a distance to coupling registrations of twenty vacant car spaces on storage track ST1, as was assumed for the first railway car cut, light relays E3, E5, E6 and E8 would be consequently picked up and the remaining E relays would be deenergized.

These light relays E then cause illumination of associated distance to coupling indicator lamps (L20, L16, etc.) shown in FIG. 1J, of the accompanying drawings. Although only a few such indicator lamps are illustrated, it should be understood that normally there would be one indicator lamp for each practical degree of vacancy on the storage tracks. Thus, for the assumed code of twenty vacant car spaces, indicator lamp L20 would be illuminated by a circuit extending from (+), through front contact 199 of relay E8, through back contact 200 of relay E7, through front contacts 201 and 202 of relays E6 and E5 respectively, through back contact 203 of relay E4, through front contact 204 of relay E3, through back contact 205 of relay 20PBP, through back contact 206 of relay PBR, and to (−).

Certain diodes DI are connected between the various indicator lamps so that every lamp indicative of a lesser degree of track vacancy than that registered on light relays E and counting relays BS will be illuminated, thus giving a more distinct visual indication of distance to coupling than if only a single indicator lamp were illuminated. That is, with lamp L20 illuminated, lamps L16 and L14 would also be illuminated by the flow of current through diodes DI.

Having thus considered the operation of the system upon passage of a first railway car cut, attention will now be given to the operation of the system when a second car cut is released from the crest of the hump, at point L in FIG. 1A. In addition, it will be assumed that the second railway car cut is destined for storage track ST2 and that the proper destination code for this second car cut has been entered into the first advance storage group (not shown) of the automatic switching system and has properly advanced into advance storage group HB.

A track fullness detecting unit UN is now selected to be associated with the second railway car cut and this selection is dependent upon the location of the first railway car cut. Thus:

If the first railway car cut has already passed the detector track circuit, extending between points O and P in FIG. 1B, unit selector relay TU1 would be dropped away and track fullness detecting unit UN1 would be selected for the second cut upon energization of unit selector relay BU1, as was previously described for the first railway car cut.

However, if the first railway car cut has not as yet entered, or is still occupying the detector track circuit, track fullness detector unit UN2 would be selected to be associated with this second railway car cut until both interrogations of the storage track ST2 have been performed. Thus, with relay AU1 energized, in accordance with the selection of unit UN1 for the first railway car cut, relay BU2 would be energized by a circuit extending from (+) in FIG. 1F, through back contact 16 of relay TU1, along wire 17 between FIGS. 1F and 1E, through front contact 207 of relay AU1, along wire 208 between FIGS. 1E and 1F, through back contact 209 of relay TU2, along wire 210 between FIGS. 1F and 1E, through back contact 211 of relay AU2, through back contacts 212 and 213 of relays BU1 and BU3 respectively, through front contacts 214 and 215 of relays HBTN and HBSD, and to (−). Similarly, if relay TU1 were still energized, indicating that the first railway car cut has entered, but not as yet passed, the detector track circuit, relay BU2 would now be energized by a circuit extending from (+), in FIG. 1F, through front contact 216 of relay TU1, back contact 209 of relay TU2, along wire 210 between FIGS. 1F and 1E, through back contacts 211 through 213 of the relays AU1, BU1 and BU3 respectively, and through front contacts 214 and 215 of relay HBTN and HBSD respectively to (—).

As was previously described for the first car cut, with the destination code for this second car cut present on the code storage relays HBCS, crest route relay CR2 would be subsequently energized and would cause storage track ST2 to be connected to the track fullness detecting unit selected for this second car cut, so as to perform the first interrogation of storage track ST2. Thus having received the analog voltage signal from the entrance end S of storage track ST2 and the biasing voltage associated with this storage track, a registration of the actual distance to coupling, for this second cut, would be set up by the decoding D relays of the selected track fullness detecting unit. Furthermore, after this registration has been completed, the operational amplifier O1, of the selected unit, would be charged.

When this second car cut enters the detector track circuit, between points O and P in FIG. 1B, the destination code for this cut advances into advance storage group 2C. At this time, route relay R2 would be energized so as to cause a second connection of storage track ST2 to the selected track fullness detecting unit for the purpose of performing a second interrogation of storage track ST2.

As for the first railway car cut, it is evident that a "no motion" indication will be received for this second railway car cut and therefore the actual distance to go registration, as derived from the decoding D relays of the selected track fullness detecting unit, will be transferred to the counting BS relays and subsequently to the release speed computer RSC exactly as the corresponding registration for the first railway car cut was transferred. In the above it is, of course, assumed that relays TE and ETK, of the selected track fullness detecting unit, have been actuated to the picked up and dropped away position respectively.

After the release speed computer RSC has been disconnected from the counting BS relays, due to the actuation of treadle TRD and the associated picking up of lock out relay LO, the number of cars in this second railway car cut is counted. As was previously described for the first car cut, the actual distance to coupling registration of the counting BS relays is now decreased by the number of cars counted in this second cut. Furthermore, after each car in the second cut is counted, the existing registration is transferred as shown in FIGS. 1M and 1N, from the counting BS relays, through front contacts 133 of relay STN, along wire group 134A between FIGS. 1M and 1N, through front contacts 217 (shown for simplicity as a single contact) to the storage relays for storage track ST2.

When considering the storage of the computed release speed analog voltage for this second railway car cut, the location of the first railway car cut, in the track layout, must again be considered. Thus:

If the first railway car cut has completely exited from group retarder GR1, relay VSR1P would be dropped away and voltage storage VS1 and weight storage WS1 would again be selected to store the computed release speed analog voltage and weight classification respectively, this time for the second car cut.

However, if the first railway car cut has not as yet left group retarder GR1; i.e. relay VSR1P is still picked up, voltage storage VSR2 will be energized by a circuit previously described and extending from (+), in FIG. 1D, through front contact 147 of relay BTP, through back contacts 148 through 150 of relays VSR4P through VSR2P respectively, through front contact 184 of relay VSR1P, through back contact 185 of relay VSR4, through back contact 186 of relay VSR1, and to (—). Thus, the computed release speed analog voltage, for the second railway car cut, would be stored on voltage storage VS2 and the weight classification, for this second cut, would be fed from rolling resistance and weight transfer and storage WRS to weight storage WS2 along wire 155, between FIGS. 1H and 1D, and through front contact 218 of relay VSR2. Subsequently, relay VSR2P is energized by a circuit including back contact 187 and front contact 188 of relays VSR1 and VSR2 respectively.

Assuming this second condition exists, with relay VSR2 picked up, only address storage relay AS2C2 of address storage AS2C, is energized, by a circuit extending from (+), through front contact 219 of relay VSR2, through "normal" contact of track switch control SC1, through front contacts 161 and 162 of relays 2CTN and 2CSD, respectively, and to (—). Thus, the energization of only relay AS2C2 is indicative of the condition wherein voltage storage VS2 has been selected to store a computed release speed analog voltage, whereas energization of both relay AS2C1 and relay AS2C2 is indicative of storage on voltage storage VS1.

The address of the computed release speed analog voltage for the second cut, is then transferred through address storage AS2B into address storage AS2A wherein relay AS2A2 is subsequently energized and this address is stored until such time as the second railway car cut is detected at the entrance of group retarder GR1. As mentioned previously, in describing the passage of the first railway car cut, the transferring of the address of the computed release speed analog voltage is performed concurrently with the transfer of the destination code for the associated railway car cut. Thus, when the destination code for this second railway car cut enters storage group 2A, of the automatic switching system, track SW2 is operated to its assumed "normal" position by proper actuation of control SC2, in accordance with the designation of the second railway car cut to storage track ST2. Such positioning of track switch SW2 is described in detail in the aforementioned patent to Brixner et al., No. 2,700,728, granted Jan. 25, 1955.

When this second car cut interrupts the light beam at point Q, in FIG. 1B, retarder storage relay 1RS2 now becomes energized by a circuit extending from (+), through back contact 164 of relay 1RSP, through front contact 165 of relay NLDTP, through front contact 166 of relay 2ASD, through back contact 220 of relay AS2A1, through front contact 221 of relay AS2A2, and to (—), and when picked up, causes transfer of the weight classification and computed release speed analog voltage, for the second car cut, onto the car retarder control apparatus of FIG. 1B. Group retarder GR1 is now positioned, as was previously described for the first car cut, to retard this second car cut sufficiently to cause smooth coupling between this second car cut and those cars already standing on storage track ST2.

When this second car cut has completely exited from group retarder GR1, relay VSR2P is now knocked down and thereby allows voltage storage VS2 to be selected again when needed.

It will now be assumed that a third railway car cut is released from the crest of the hump, at point L in FIG. 1A, that this third cut is destined for storage track ST1, and furthermore that the destination code for this cut has properly advanced into advance storage group HB, of the automatic switching system. As was previously discussed, when considering the passage of the first and second railway car cuts, a track fullness detecting unit is now selected, to be associated with this third railway car cut, dependent upon the location of the first and second car cuts in the track layout.

Since it was assumed that the destination code for this third car cut has advanced to code storage relays HBCS, crest route relay CR1 is now energized in accordance with the designation of this third railway car cut to storage track ST1. At this time, the first interrogation of storage track ST1 is performed for the third railway car cut. Thus, the existing analog voltage signal and the biasing voltage associated with storage track ST1 are now fed as input to the selected track fullness detecting unit. This analog input voltage is then converted into the actual distance to coupling registration by the decoding D relays, and operational amplifier O1, of the selected track fullness detecting unit, is subsequently charged.

When this third railway car cut enters the detector track circuit, extending between points O and P in FIG. 1B, route relay R1 is energized so as to perform the second interrogation of storage track ST1; i.e. the analog voltage signal now existing at the entrance end S, of storage track ST1, is compared with that charged on operational amplifier O1 of the selected track fullness detecting unit. As mentioned earlier, if these two values of the analog voltage signal, from storage track ST1, are of equal magnitude, a "no motion" indication will be received, i.e. motion detector relay MD will be deenergized. However, if these two values of the analog voltage signal are of unequal magnitude, motion detector relay MD will be picked up thus indicating that motion has occurred, on storage track ST1, between interrogations of this storage track.

Assuming now that track fullness detecting unit UN1, of FIGS. 1R and 1S, has been selected for this third car cut, that relay TE is picked up and relay ETK is deenergized, if motion detector relay MD is deenergized, relay TTN will subsequently be energized and the actual distance to coupling registration, as derived from the decoding D relays of the selected track fullness detecting unit UN1, will be transferred to the counting BS relays and subsequently to the release speed computer RSC.

However, if motion has occurred between interrogations of storage track ST1, relay STN will be picked up by a circuit extending from (+), in FIG. 1S, through front contact 222 of relay MD, along wire 223 between FIGS. 1S and 1T, through front contacts 224 and 225 of relays TU1P and MD–TE respectively, along wire 226 between FIGS. 1T and 1L, through back contact 227 of relay TTN, along wire 228 between FIGS. 1L and 1M, and to (−). With relay STN picked up, the stored distance to coupling registration, from storage relays BS2P through BS8P, shown in FIG. 1N, will be transferred to the counting BS relays through front contacts 119 of route relay 1R, along wire group 134 between FIGS. 1N and 1M, through front contacts 133 of relay STN, and through back contacts 95 of relay CPPP. As previously discussed, this stored distance to coupling registration was established by decreasing the distance to coupling registration, associated with the first railway car cut, by the number of cars in that first car cut.

This stored distance to coupling registration is then transferred from the counting BS relays to the relay speed computer RSC upon energization of relay TD, as was previously described. Subsequently, the release speed computer RSC utilizes this stored distance to coupling registration when computing the release speed at which group retarder GR1 should be actuated to an "open" or non-braking position for the third railway car cut.

After the release speed computer RSC has been disconnected from the counting BS relays, the number of cars in this third railway car cut is counted. This car count is then substracted from that stored distance to coupling registration utilized by the release speed computer RSC, and the resulting distance to coupling registration is then stored on storage relays BSP. Thus, a stored distance to coupling registration has been provided for the next railway car cut destined for storage track ST1.

In the above, it was conveniently assumed that relay TE was picked up and that relay ETK was deenergized. Referring now to FIGS. 1S of the accompanying drawings, it is evident that if either of these assumed conditions were not met; i.e. if relay TE is deenergized or relay ETK is energized, relay STN would be energized irrespective of the position of motion detector relay MD, and would cause the stored distance to coupling registration to be utilized, in preference to the actual distance to coupling registration, when computing the release speed for the third car cut. As mentioned earlier, relay TE is included to detect that a sufficient time interval, needed to detect motion, has elapsed between interrogations and relay ETK is included to detect that the designated storage track has not been filled to capacity.

The storage of the computed release speed analog voltage, for this third railway car cut, is performed exactly as was described earlier for the first and second railway car cuts; i.e. dependent upon the location of previous car cuts in the track layout. Furthermore, the address of the computed release speed analog voltage, for the third railway car cut, is transferred, concurrently with the destination code of this third car cut, until such time as the third car cut is detected at the entrance to group retarder GR1. When such detection occurs, this computed analog voltage and the weight classificaiton for the third car cut are fed to the retarder control apparatus shown in FIG. 1B. In addition, when the destination code for this third railway car cut has reached storage group 2A of the automatic switching system, track switch SW2 is actuated to its assumed "reverse" position in accordance with the designation of this third railway car cut to storage track ST1.

In the foregoing, it was pointed out that the actual distance to coupling registration, associated with any particular railroad car cut, would only be selected for car retarder control purposes, provided certain conditions were met. Thus, referring now to FIG. 1S of the accompanying drawings, it was pointed out that the following conditions were necessary for energization of relay TTN, shown in FIG. 1L, so as to use the actual distance to coupling registration associated with a particular railroad car cut: motion detector relay MD must be deenergized, thus indicating that no motion has occurred between interrogations of the designated storage track; time delay relay TE must be energized, indicating that a sufficient time interval has occurred between interrogations of the designated storage track; and relay ETK must be deenergized, indicating that the designated storage track is not filled to capacity. Furthermore, it was pointed out that the stored distance to coupling registration would be utilized, for car retarder control purposes, if any of the above conditions were not satisfied.

Referring now to FIGS. 1M and 1N of the accompanying drawings, it is seen that another energizing circuits for relay STN, so as to select the stored distance to coupling registration in preference to the actual distance to coupling registration, is provided to insure that the stored distance to coupling registration will be utilized, for car retarder control purposes, where the designated storage track is filled up to its entrance end.

To accomplish this energization of relay STN, and thereby select the stored distance to coupling registration, the associated energizing circuit is completed as soon as the storage relays, for the designated storage track, assume a distance to coupling registration indicative of the known distance between the entrance end of the designated storage track and the exit end of the associated group retarder.

Referring now to the code chart of FIG. 2, and assuming that the distance, between the exit end of group retarder GR1 and the entrance end of the storage track ST1, is equal to six car spaces, relay STN can be energized by a circuit extending from (+) in FIG. 1N, through front contact 229 of storage relay BS8P, through back contacts 230 through 232 of storage relays BS7P through BS5P respectively, through front contacts 233 and 234 of storage relays BS4P and BS3P respectively, through front contact 119 of route relay R1, along wire 235 between FIGS. 1N and 1M, and to (−). Thus, relay STN is energized, so as to select the stored distance to coupling registration for a car cut destined for storage track ST1 when the storage relays associated with storage ST1 assume a registration of six car spaces.

Furthermore, a push button MAN, shown in FIG. 1N, is also provided for manually energizing relay STN, so as to select the stored distance to coupling registration, if it is observed, for example, that the constant current track circuit is not functioning properly because of a broken bond, etc.

In a car retarder control system, as proposed by the present invention, it is sometimes necessary for the hump operator to make certain corrections to the stored distance to coupling registration. For the purpose of explaining the correction apparatus illustrated herein, it will be assumed that a railway car cut has entered, and stopped short of its desired coupling point, on storage track ST1, illustrated in FIG. 1C, and that the operator now wishes to correct the stored distance to coupling registration associated with storage track ST1 in the event that this registration is needed for a subsequent car cut designated for this same storage track.

Correction

Referring now to FIG. 1N of the accompanying drawings, a plurality of track push buttons TPB are provided, one for each storage track. Each of these track push buttons are of such construction that, when depressed, it will be remained in a depressed position until the associated winding WI is energized: i.e., if a track push button is depressed and current is then caused to flow in the associated winding WI, an electromagnetic force is produced which pulls the push button away from its depressed position. Obviously, such a flow of current in winding WI only occurs when relay G1-SOL is energized.

Since a correction is to be made for storage track ST1, the operator depresses track push button 1TPB, thus completing the energizing circuit for relay G1, extending from (+) in FIG. 1P, through back contact 196 of relay G2, along wire 195 between FIGS. 1P and 1N, through contact 236 of push button 1TPB and to (—). This picking up of relay G1 furthermore opens the stick circuit for relay AIPBP, at back contact 194 of relay G1, thereby causing drop away of relay AIPBP and thus disconnecting the light relays E from the counting relays BS.

With push button 1TPB depressed and relay G1 energized, track relay 1TR is now energized by a circuit extending from (+) in FIG. 1N, through back contact 237 of route relay R1, through contact 238 of push button 1TPB, through front contact 239 of relay G1, along wire 240 between FIGS. 1N and 1P, through back contact 241 of relay RTP to (—). Similarly, the energizing circuit for each of the other track relays TR extends through a back contact of the corresponding route relay, so as to prevent a correction while the stored distance to coupling is being fed to release speed computer RSC or while a car count is in progress.

With relay 1TR picked up, the stick circuit for storage relay BS8P is now shifted from back contact 137 of track relay 1TR to front contact 242 of relay 1TR and now extends between (—) in FIG. 1N, through front contact 138 of relay BS8P, through front contact 242 of track relay 1TR, along wire 243 between FIGS. 1N and 1P, and to (+), either through back contact 244 of relay PBR or through the series connected back contacts 245 through 250 of light repeater relays EP3 through EP8 respectively. The stored distance to coupling registration for storage track ST1, now existing on storage relays BSP, is transferred to light relays E3 through E8, shown in FIG. 1P, through front contacts 251 of track relay 1TR, along wire group 252 between FIGS. 1N and 1P, through back contacts 253 of relay AIPBP, and to the associated minuses.

Referring now to FIG. 1P, certain correction push buttons (20PB, 16PB, etc.) are illustrated and although not shown in detail, it is intended that these correction push buttons be similar in construction to the track push buttons TPB; i.e. when a correction push button is depressed it will remain in its depressed position until relay C-SOL (shown in FIG. 1P) is energized, at which time any depressed correction push button will be actuated away from its depressed position. Furthermore, although only a few correction push buttons are illustrated, it is obvious that, in application, a greater number of such push buttons would be employed. The operator would now depress the desired correction push button, and cause energization of relay PBR by a circuit extending from (+), through the contact of the depressed correction push button, through back contact 254 of relay RTP and to (—). Furthermore, once relay PBR is picked up, it is stuck in this position until the depressed push button is released. At this time, a stick circuit for track relay 1TR s also completed and extends from (+) in FIG. 1N, through back contact 237 of route relay R1, through front contact 255 of relay 1TR, along wire 256 between FIGS. 1N and 1P, through front contact 257 of relay PBR, through back contact 241 of relay RTP, and to (—).

Before proceeding further with the correction operation, it is necessary at this time to discuss the operation of relay RTP. Referring to FIG. 1H, it was previously pointed out that route relay R1 was energized, through a back contact of the corresponding track relay 1TR, where the destination code, for a car cut being routed to storage track ST1, arrived at advance storage group 2C of the automatic switching system. Suppose now that a correction operation, for storage track ST1, has been initiated, as is described above, but that the desired correction push button has not as yet been depressed. If a car cut, destined for storage track ST1, enters the detector track beginning at point O in FIG. 1B, the destination storage relays of advance storage group 2C will call for route relay R1 to be energized, so as to perform the second interrogation of storage track ST1. With track relay 1TR picked up, relay RTP is now energized by a circuit extending from the destination storage relays of advance storage group 2C, in FIG. 1H, through front contact 258 of track relay 1TR, along wire 259 between FIGS. 1H and 1P, through back contact 260 of relay PBR, and to (—). When relay RTP picks up, the energizing circuit for track relay 1TR is opened at back contact 241 of relay RTP, thus, causing drop away of relay 1TR, to permit pick up of route relay R1. In addition, with relay RTP picked up, the energizing circuit for relay PBR is opened at back contact 254 of relay RTP so that the initiated correction operation cannot proceed.

Assuming that relay RTP is not energized at this time and that relay PBR has been picked up, light repeater relays EP are now energized in accordance with the distance to coupling registration existing on storage relays BSP and light relays E; i.e. certain light repeater relays EP are energized by a circuit extending from (+) in FIG. 1P, through front contact 261 of relay PBR, through front contacts of the energized light relays E and to the associated minuses. Furthermore this stored distance to coupling registration is stored on light repeater relays EP by a common stick circuit extending through the front contacts of the energized light repeater relays EP, through back contact 262 of the correction relay COR, and to (+).

As soon as the light repeater relays establish the distance to coupling registration, storage relays BSP are now denergized, since both existing stick circuits for relay BS8P are now open, and subsequently results in the deenergization of light relays E, shown in FIG. 1P. Furthermore with storage relays BSP deenergized, relay CC, shown in FIG. 1P, is now energized by a circuit extending from (+) in FIG. 1N, through back contact 121 of relay BS8P, through back contact 120 of relay BS7P, through front contact 263 of track relay 1TR, along wire 264 between FIGS. 1N and 1P, through front contact 265 of relay PBR and to (—). Relay CC is then stuck in this picked up position until the depressed correction push button is released.

Suppose, at this time, that a car cut enters the detector track circuit and that route relay R1 is subsequently called for by the destination storage relays of advance storage group 2C. Since relay PBR is picked up, relay RTP cannot be energized to knock down track relay 1TR, and consequently, route relay R1 cannot be energized so as to perform a second interrogation of the designated storage track ST1.

Referring again to FIG. 1P of the accompanying drawings, certain correction repeater relays (20PBP, 16PBP, etc.), are provided and are energizable, in accordance with the depression of an associated correction push button, provided that the associated correction push button is not indicative of a greater distance to coupling registration than that now registered on light repeater relays EP3 through EP8. This restrictive energization of the correction repeater relays is obtained by completing the energizing circuits for the correction repeater relays, through various contacts of light repeater relays EP. For example, if the distance to coupling registration stored on light repeater relays EP3 to EP8 is indicative of 16 vacant car spaces on storage track ST1, light repeater relays EP5 and EP8 would be energized while the remaining light repeater relays would be deenergized thus, correction repeater relay 16PBP is the maximum correction repeater relay that can be energized. Referring to FIG. 1P, it will be noted that diodes DIC also permit the energization of any correction repeater relay indicative of a lesser degree of distance to coupling than that stored on light repeater relays EP3 through EP8, in accordance with the so called "thermometer" effect.

Assuming now that a correction repeater relay PBP has been properly energized, by a circuit extending from (+) in FIG. 1P, through front contact 266 of relay CC, through closed contact 267 of the associated correction push button, through various front and back contacts of light repeater relays EP3 through EP8, and to (−), the corrected distance to coupling registration is now transferred onto the storage relays BSP by proper energization of certain wires of wire group 252 in FIG. 1P, due to the picking up of a correction repeater relay PBP, along wire group 252 between FIGS. 1P and 1N, through front contacts 251 of track relay 1TR and to the associated minuses. At the same time, this corrected distance to coupling registration is also transferred to light relays E3 through E8, through back contacts 253 of relay AIPBP.

Referring now to FIG. 1J of the accompanying drawings, relay COR is now energized from (+), through various front and back contacts of light relay E3 through E8, depending upon the corrected distance to coupling registration, through front contact 268 of the energized correction repeater relay and to (−), and is further stuck in an energized position by a circuit extending through front contact 269 of relay COR, through front contact 270 of relay PBR, and to (+). Thus it is seen that the picking up of relay COR checks that the corrected registration, established by the light relays E3 to E8, is in agreement with the code assigned to the depressed correction push button PB.

With correction relay COR in a picked up position, the corrected distance to coupling registration is now stored on storage relays BSP by completion of a stick circuit for the storage relays BS7P and BS8P which extends from (+) in FIG. 1P, through front contact 271 of relay COR, along wire 243 between FIGS. 1P and 1N, and through front contact 242 of track relay 1TR. If, at this time, route relay R1 is called for by the destination storage relays of advance storage group 2C, relay RTP can now be energized, so as to drop track relay 1TR, by a circuit extending from the destination storage relays of storage group 2C, shown in FIG. 1H, through front contact 258 of track relay 1TR, along wire 259 between FIGS. 1H and 1P, through front contact 272 of relay COR, and to (−). Therefore, route relay R1 if called for, could be picked up so as to permit a second interrogation of storage track ST1.

From the above it is evident that while a correction is being made to the stored distance to coupling registration, for a particular storage track, a second interrogation of that storage track cannot be performed; that is, the picking up of an associated route relay is delayed until the correction has been completed.

The correction operation having been completed; i.e. the stored distance to coupling registration has been corrected as desired, the signal bell BL shown in FIG. 1P, is now energized by a circuit extending from (+), through front contact 273 of relay COR, and to (−). This bell BL thus gives an audio indication that the correction operation has been completed. Furthermore, relay C-SOL is now energized by a circuit extending from (+), through front contact 247 of relay COR, and to (−), so as to release the depressed correction push button.

The operator then depresses automatic interrogation push button AIPB, shown in FIG. 1P, and thereby causes energization of relay G1-SOL (shown in FIG. 1N) by a circuit extending from (+), through contact 275 of push button AIPB, along wire 276 between FIGS. 1P and 1N, through front contact 277 of relay G1, and to (−). When relay G1-SOL picks up, current then flows from (+), through front contact 278 of relay G1-SOL, through winding WI, and to (−), so as to release the depressed track push button 1TPB.

It was mentioned earlier that relay STN, shown in FIG. 1M, would be energized when a car cut being routed occupied the detector track circuit, if the stored distance to coupling registration, for the designated storage track, is indicative of the known distance existing between the entrance end of the storage track and the exit end of the associated group retarder. For example, it was shown that relay STN would be energized, when a car cut, destined for storage track ST1, occupied the detector track circuit if the storage relays BSP, shown in FIG. 1N, registered a distance to coupling of six car spaces.

However, if storage track ST1 were now "pulled down," i.e. the vacancy of storage track ST1 was increased, the stored distance to coupling registration for storage track ST1 would still be indicative of six car spaces. Therefore, when the second interrogation of storage track ST1 was performed for the next car cut going to storage track ST1, relay STN would be energized even though storage track ST1 may be emptied.

To overcome this, the operator is permitted to extend the stored distance to coupling registration a short distance past the entrance end of the associated storage track. For example, relay 8PBP, shown in FIG. 1P, can be energized, if desired, by a circuit extending from (+), through front contact 266 of relay CC, through contact 267 of correction push button 8PB, along wire 279 between FIGS. 1P and 1N, through front contact 280 of track relay 1TR and to (−). Thus, the operator is permitted to extend the stored distance to coupling registration, for storage track ST1, two car lengths past the entrance end of storage track ST1, so as to return the system to automatic operation wherein the actual distance to coupling registration may be utilized, under proper conditions, as was previously discussed.

*Summary*

In the modern classification yard, a railway car cut is routed to its designated storage track by a destination code, established at the hump tower. Thus, the destination code for each car cut is entered into an automatic switching system comprised of a plurality of storage groups, wherein the various destination codes advance along with the associated car cuts, so as to properly position those track switches to be encountered by the cuts as they progress from the crest of the hump to their designated storage tracks. Furthermore, a hump retarder is provided to apply a "rough" degree of retardation to each car cut being routed, while a plurality of group retarders, one for each group track, are provided to apply the correct amount of retardation to the car cuts going through them, to cause smooth coupling between the cuts and the cars already standing on the designated storage tracks. In the present invention, each group car retarder is positioned in accordance with the distance a car cut must travel to its coupling point, after leaving the associated group retarder. Furthermore, to control such positioning of the group retarders, a release speed analog computer is employed which, upon receiving distance to coupling information and information regarding the free rolling movement of each car cut, provides as output an analog voltage of the correct speed at which each car cut should exit from the associated group retarder.

After the destination code for a particular car cut has been entered into the automatic switching system, a first interrogation of the designated storage track is performed; i.e. the designated storage track is interrogated, and a digital registration indicative of length of the track, then existing between the last car having entered the storage track and the exit end of the associated group car retarder, is recorded. This then is a registration of the actual distance to coupling. However, this registration is obviously unusable, as input to the analog computer, if the last car, having entered the designated storage track, is in motion.

At some predetermined later time, then, a second interrogation of the designated storage is performed and the existing vacancy is compared with that obtained from the first interrogation, so as to determined the motional status on the designated storage track, and therefore the usability of the actual distance to coupling registration.

A stored distance to coupling registration is also furnished, in accordance with the present invention, and is applied to the analog computer in preference to the actual distance to coupling registration, if any condition exists wherein the actual distance to coupling registration is unusable; that is, (1) if motion has occurred, between interrogations of the designated storage track, (2) if insufficient time, to detect motion, has elapsed between interrogations, or (3) if the designated storage track is filled to capacity. This stored distance to coupling registration, for any car cut, is obtained by modifying that registration selected for the preceding car cut designated for the same storage track, by the number of cars counted in the preceding cut.

If the actual distance to coupling registration is selected for input to the release speed computer, it is advisable to convert this registration from a scalar or conventional binary sequence to a reflected binary sequence. In the present invention, such conversion is accomplished by simple relay contact circuits and without resort to complex electronic circuits.

A single release speed computer is employed and the computed output voltages, for successive railway car cuts, are stored and transferred until a cut is detected at the entrance to its associated group retarder, at which time the computer release speed analog voltage, for this car cut, is transferred to certain retarder control apparatus which operates the group retarder to the proper degee of retardation.

In a car retarder control system, as proposed by the present invention, it is sometimes necessary for the hump operator to make certain corrections to the stored distance to coupling registration. However, it has been observed that some hump operators will, for example, deliberately extend this distance to coupling registration in order to drive down a "stopped short" car or cut. To prevent such extensions, certain preventive circuits are provided and restrict the operator to corrections indicative of a lesser distance to coupling than that existing as the stored distance to coupling registration, unless such extensions are necessary to maintain automatic operation of the system.

Having described a car retarder control system, as one specific embodiment of the present invention, it is desired to be understood that this form is selected to facilitate in the disclosure of the invention rather than to limit the number of forms which it may assume; and, it is to be further understood the various modifications, adaptations and alterations may be applied to the specific form shown to meet the requirements of practice, without in any manner departing from the spirit or scope of the present invention.

What I claim is:

1. In a control system for a car retarder in a railway classification yard including a plurality of storage tracks to which railway car cuts are selectively routed, the combination of, registration means for providing a registration of available storage space on each of said storage tracks, car retarder control means for operating said car retarder to apply a predetermined amount of braking action to a particular car cut passing therethrough in accordance with the available storage space on the storage track to which said particular car cut is being routed as registered by said registration means, correction means effective when manually operated to one of a plurality of conditions each associated with a predetermined value of available storage space for changing the existing registration of said registering means into agreement with that value associated with the operated condition of said correction means, and means responsive to the existing storage space registration of said registering means and the predetermined value of storage space associated with each manually operated condition of said correction means for permitting a change in the existing available storage space registration of said registering means only provided that the predetermined value of storage space associated with the operated position of said correction means is less than the existing storage space registration of said registering means.

2. A car retarder control system for a hump classification yard having a car retarder disposed in a stretch of railway track in approach of a storage track comprising, in combination, first registering means for providing a registration distinctive of a predetermined distance on said storage track, second registration means for providing a registration distinctive of the actual distance that a car cut destined for said storage track must travel to the last car cut having entered said storage track, motion detector means for detecting whether or not the last car cut having entered said storage track is in motion, car retarder control means for operating said car retarder in accordance with the registration of either said first or second registering means dependent respectively upon whether or not said last cut is in motion on said storage track as detected by said motion detector means, manually operated means for changing the predetermined distance registered by said first registering means, and means for preventing manual extensions of the registration of said first registering means.

3. In a car retarder control system for a railway classification yard wherein railway car cuts are selectively routed to designated ones of a plurality of storage tracks, the combination of, a first plurality of registering devices rendered effective for each car cut being routed to provide a registration in conventional binary code form indicative of the number of available car storage spaces on the designated storage track to which said car cut is destined, a second plurality of registering devices, converter means responsive to the registration of said first plurality of registering devices for actuating said second plurality of registering devices to provide a registration in reflected binary code form indicative of said number of available car storage spaces on said designated storage track, whereby only one of said second registering devices is actuated for each integral change in the number of available storage space on said designated storage track, a car retarder for retarding the car cut being routed to said designated storage track, and car retarder control means responsive to the reflected binary code form registration of said second plurality of registering devices for operating said car retarder to apply retardation to said car cut in accordance with the available storage space on said designated storage track.

4. The combination specified in claim 3 wherein said first and second pluralities of registering devices are respectively first and second pluralities of electromagnetic relays, and wherein said code converter means includes:

a source of electric current having two terminals of opposite polarity, one of said terminals being connected to certain predetermined contacts of said first plurality of registering relays and the other of said terminals being connected to one side of the winding for each of said second plurality of registering relays, and circuit means for connecting the other side of the winding for each of said second plurality of registering relays to certain other predetermined contacts of said first plurality of registering relays, whereby said second plurality of relays is energized in reflected binary code sequence as said first plurality of registering relays is actuated in said conventional binary code sequence.

References Cited

UNITED STATES PATENTS

| | | |
|---|---|---|
| 1,586,989 | 6/1926 | Haines. |
| 2,045,201 | 6/1936 | Rabourdin _____ 246—182 |
| 2,891,144 | 6/1959 | Yalich et al. _____ 246—182 |
| 2,930,888 | 3/1960 | Crawford et al. |
| 2,939,112 | 5/1960 | Faulkner _____ 340—168 |
| 2,946,984 | 7/1960 | Breed et al. _____ 340—168 |
| 2,954,462 | 9/1960 | Utt et al. _____ 246—182 X |
| 2,964,617 | 12/1960 | Mishelevich et al. __ 246—182 X |
| 2,976,406 | 3/1961 | Staples _____ 246—182 |
| 3,226,541 | 12/1965 | Brinker et al. _____ 246—182 |
| 3,247,372 | 4/1966 | Fitzsimmons et al. ___ 246—182 |

FOREIGN PATENTS

| | | |
|---|---|---|
| 208,415 | 5/1957 | Australia. |
| 921,845 | 1/1947 | France. |
| 825,818 | 12/1959 | Great Britain. |
| 841,362 | 7/1960 | Great Britain. |

OTHER REFERENCES

A thesis prepared by Wilhelm Koth and titled "Die Laufziel-Steureung in der Ablaufdynamik," Germany, 151 pages.

A Berti and Dosch article titled "An Automatic Speed Control System for a Gravity Freight Classification Yard," presented in (Paper No. 58–1266) at A.E.E.E. Fall General Meeting, Pittsburgh, Pa., Oct. 26–31, 1958.

ARTHUR L. LA POINT, *Primary Examiner.*

LEO J. LEONNIG, LEO QUACKENBUSH, STANLEY T. KRAWCZEWICZ, *Examiners.*